(12) United States Patent
Bagheri et al.

(10) Patent No.: US 12,526,842 B2
(45) Date of Patent: Jan. 13, 2026

(54) EARLY TERMINATION OF AN UPLINK TRANSMISSION

(71) Applicant: Lenovo (Singapore) Pte. Ltd., New Tech Park (SG)

(72) Inventors: Hossein Bagheri, Urbana, IL (US); Ankit Bhamri, Rödermark (DE); Hyejung Jung, Northbrook, IL (US); Alexander Johann Maria Golitschek Edler von Elbwart, Darmstadt (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 389 days.

(21) Appl. No.: 18/018,839

(22) PCT Filed: Jul. 29, 2021

(86) PCT No.: PCT/IB2021/056940
§ 371 (c)(1),
(2) Date: Jan. 30, 2023

(87) PCT Pub. No.: WO2022/024044
PCT Pub. Date: Feb. 3, 2022

(65) Prior Publication Data
US 2023/0319885 A1     Oct. 5, 2023

Related U.S. Application Data

(60) Provisional application No. 63/058,400, filed on Jul. 29, 2020, provisional application No. 63/058,381, filed on Jul. 29, 2020.

(51) Int. Cl.
*H04W 74/0816* (2024.01)
*H04L 5/00* (2006.01)
(Continued)

(52) U.S. Cl.
CPC ....... *H04W 74/0816* (2013.01); *H04L 5/0048* (2013.01); *H04W 72/1263* (2013.01); *H04W 74/0808* (2013.01)

(58) Field of Classification Search
None
See application file for complete search history.

(56) References Cited

U.S. PATENT DOCUMENTS

| 2018/0103458 A1 | 4/2018 | Tooher et al. |
| 2019/0261388 A1 | 8/2019 | Yoon et al. |

(Continued)

FOREIGN PATENT DOCUMENTS

| CN | 110769501 A | 2/2020 |
| WO | 2020020006 A1 | 1/2020 |

(Continued)

OTHER PUBLICATIONS

PCT/IB2021/056940, "Notification of Transmittal of the International Search Report and the Written Opinion of the International Searching Authority, or the Declaration", International Searching Authority, Nov. 15, 2021, pp. 1-13.

(Continued)

*Primary Examiner* — Anh Vu H Ly
(74) *Attorney, Agent, or Firm* — Kunzler Bean & Adamson

(57) ABSTRACT

Apparatuses, methods, and systems are disclosed for early termination of an uplink transmission. One method includes starting to transmit a first uplink transmission with a first duration in a beginning of a CO period. The method includes determining to terminate the first uplink transmission earlier than an end of the first duration based on: repetitions associated with the first uplink transmission; or a duration of overlapping CG resources. The first uplink transmission can be sent in any of the overlapping CG resources, and each of (Continued)

the overlapping CG resources is associated with a different CG configuration than a CG configuration associated with another overlapping CG resource. The method includes terminating the first uplink transmission earlier than the end of the first duration.

18 Claims, 11 Drawing Sheets

(51) Int. Cl.
*H04W 72/1263* (2023.01)
*H04W 74/0808* (2024.01)

(56) References Cited

U.S. PATENT DOCUMENTS

| | | | |
|---|---|---|---|
| 2019/0335456 | A1 | 10/2019 | Yerramalli et al. |
| 2019/0342911 | A1 | 11/2019 | Talarico et al. |
| 2020/0128583 | A1* | 4/2020 | Yerramalli ........ H04W 72/0446 |
| 2020/0146034 | A1 | 5/2020 | Bagheri et al. |
| 2020/0280971 | A1 | 9/2020 | Moon et al. |
| 2021/0051702 | A1 | 2/2021 | Bhattad et al. |
| 2021/0105815 | A1 | 4/2021 | Salem |
| 2022/0007336 | A1 | 1/2022 | Sun et al. |
| 2022/0070922 | A1* | 3/2022 | Talarico ............ H04W 72/1268 |
| 2022/0167407 | A1* | 5/2022 | Oviedo ............. H04W 72/0446 |
| 2022/0174735 | A1* | 6/2022 | Li .................... H04W 74/0816 |
| 2022/0183053 | A1* | 6/2022 | Li .................... H04W 74/0808 |

FOREIGN PATENT DOCUMENTS

| | | |
|---|---|---|
| WO | 2020033689 A1 | 2/2020 |
| WO | 2021194108 A1 | 9/2021 |

OTHER PUBLICATIONS

PCT/IB2021/056945, "Notification of Transmittal of the International Search Report and the Written Opinion of the International Searching Authority, or the Declaration", International Searching Authority, Nov. 12, 2021, pp. 1-14.

CATT, "Channel Access Procedures for NR Unlicensed Operations", 3GPP TSG RAN WG1 Meeting #95 R1-1813281, Nov. 12-16, 2018, pp. 1-6.

Mediatek Inc., "Study and evaluation of configured-grant enhancements for URLLC", 3GPP TSG RAN WG1 Ad-Hoc Meeting 1901 R1-1900213, Jan. 21-25, 2019, pp. 1-8.

Ericsson, "Channel access procedures", 3GPP TSG-RAN WG1 Meeting #99 R1-1912709, Nov. 18-22, 2019, pp. 1-10.

Qualcomm Inc., "Channel access procedures for NR unlicensed", 3GPP TSG RAN WG1 Meeting #99 R1-1912938, Nov. 18-22, 2019, pp. 1-18.

Ericsson, "Views on WID objective for IIOT/URLLC operation over shared spectrum", 3GPP TSG-RAN Meeting #88-e RP-200826, Jun. 29-Jul. 3, 2020, pp. 1-6.

3GPP, "3rd Generation Partnership Project; Technical Specification Group Radio Access Network; Physical layer procedures for shared spectrum channel access (Release 16)", 3GPP TS 37.213 V16.1.0, Mar. 2020, pp. 1-25.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Multiplexing and channel coding (Release 16)", 3GPP TS 38.212 V16.1.0, Mar. 2020, pp. 1-146.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.

3GPP, "3rd Generation Partnership Project; Technical Specification Group Radio Access Network; NR; Medium Access Control (MAC) protocol specification (Release 16)", 3GPP TS 38.321 V16.0.0, Mar. 2020, pp. 1-141.

3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

U.S. Appl. No. 18/018,844, "Office Action Summary, United States Patent and Trademark Office", May 19, 2025, pp. 1-15.

* cited by examiner

EARLY TERMINATION OF AN UPLINK TRANSMISSION

CROSS-REFERENCE TO RELATED APPLICATIONS

This application claims priority to United States Patent Application Ser. Number "APPARATUSES, METHODS, AND SYSTEMS FOR UL 63/058,381 entitled TRANSMISSION BURST MANAGEMENT OF UE INITIATED CHANNEL OCCUPANCY" and filed on Jul. 29, 2020 for Hossein Bagheri, and U.S. Patent Application Ser. No. 63/058,400 entitled "URLLC COMMUNICATION OPERATION IN UNLICENSED ENVIRONMENT VIA UE INITIATED CHANNEL OCCUPANCY" and filed on Jul. 29, 2020 for Hossein Bagheri, all of which are incorporated herein by reference in their entirety.

FIELD

The subject matter disclosed herein relates generally to wireless communications and more particularly relates to early termination of an uplink transmission.

BACKGROUND

In certain wireless communications networks, transmissions may overlap with one another. In such networks, interference may occur based on the overlapping transmissions.

BRIEF SUMMARY

Methods for early termination of an uplink transmission are disclosed. Apparatuses and systems also perform the functions of the methods. One embodiment of a method includes starting to transmit a first uplink transmission with a first duration in a beginning of a channel occupancy period. In some embodiments, the method includes determining to terminate the first uplink transmission earlier than an end of the first duration based on: repetitions associated with the first uplink transmission: or a duration of overlapping configured grant resources. The first uplink transmission can be sent in any of the overlapping configured grant resources, and each of the overlapping configured grant resources is associated with a different configured grant configuration than a configured grant configuration associated with another overlapping configured grant resource. In certain embodiments, the method includes terminating the first uplink transmission earlier than the end of the first duration in response to determining to terminate the first uplink transmission earlier than the end of the first duration.

One apparatus for early termination of an uplink transmission includes a user equipment. In some embodiments, the apparatus includes a processor that: starts to transmit a first uplink transmission with a first duration in a beginning of a channel occupancy period: determines to terminate the first uplink transmission earlier than an end of the first duration based on: repetitions associated with the first uplink transmission: or a duration of overlapping configured grant resources, wherein the first uplink transmission can be sent in any of the overlapping configured grant resources, each of the overlapping configured grant resources is associated with a different configured grant configuration than a configured grant configuration associated with another overlapping configured grant resource; and terminates the first uplink transmission earlier than the end of the first duration in response to determining to terminate the first uplink transmission earlier than the end of the first duration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
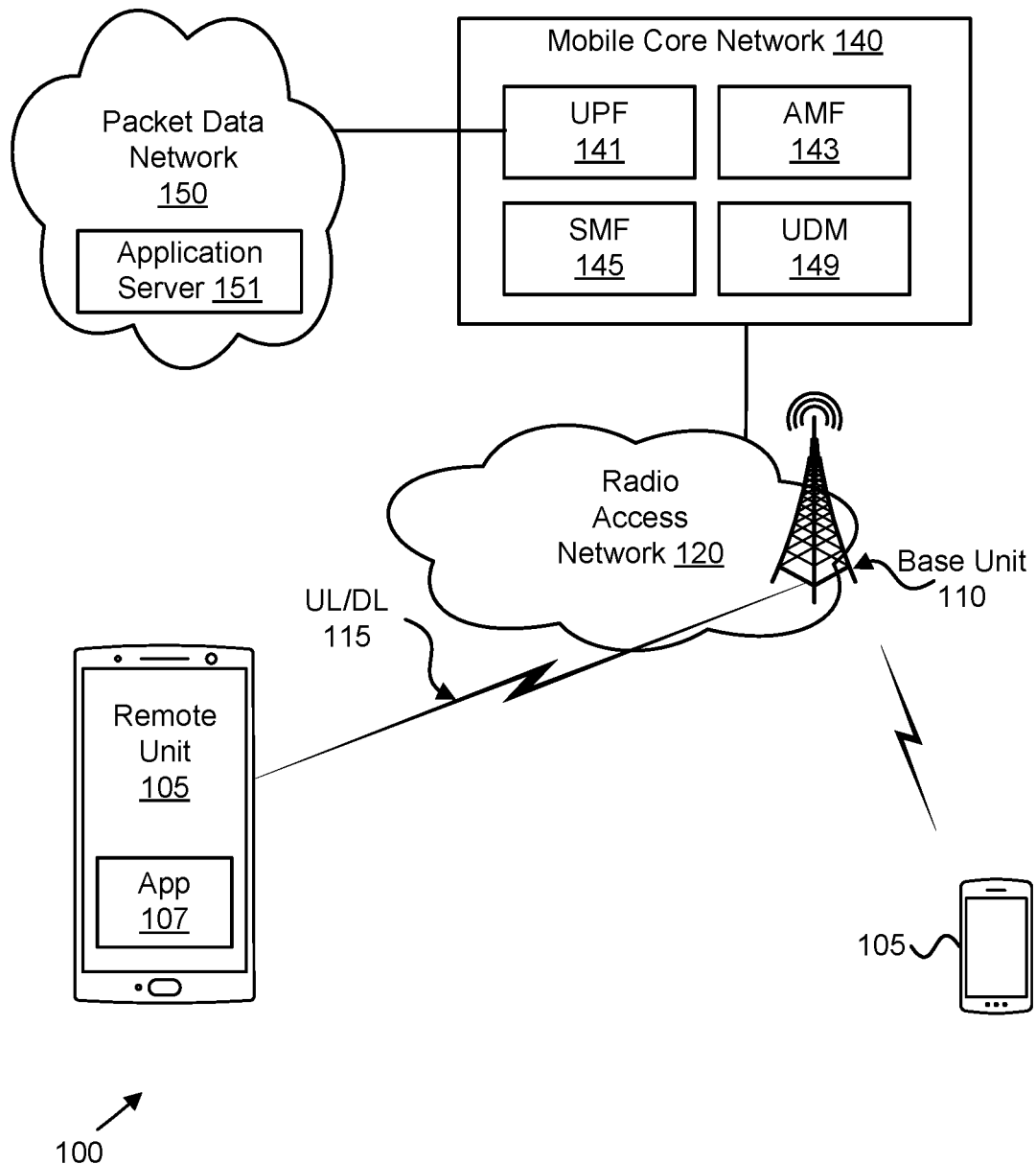
FIG. 1A is a schematic block diagram illustrating one embodiment of a wireless communication system for early termination of an uplink transmission.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For operation in unlicensed spectrum, when semi-static channel access is used (i.e., operation according to Frame-Based Equipment ("FBE")), downlink ("DL") and uplink ("UL") transmissions are allowed within a frame period ("FP") that a gNB or a UE has acquired (via channel sensing techniques).

One benefit of UE-initiated COT is the reduced latency of the configured grant ("CG") Physical Uplink Shared Channel ("PUSCH") transmission. Because the gNB may not be aware if there is any data to be transmitted by the UE, and the gNB may not have any DL or UL data, control, or reference signal to schedule or transmit. Hence, the gNB may not sense the channel to acquire a Channel Occupancy Time ("COT"). By allowing some of the UEs in a cell—in certain conditions—to initiate a COT (instead of allowing all/many UEs to initiate a COT) at the beginning of a frame period may have certain advantages, such as allowing UEs to have latency sensitive data to transmit their UL data/control first by avoiding collision with other UEs which might have data/control that can tolerate some latency.

When COT sharing with the gNB is desired for the UE-initiated COT, a first UL burst sent by the UE initiating the COT should not take most of the acquired FFP: otherwise, there will not be many time resources left for COT sharing.

FIG. 1A depicts a wireless communication system 100 for early termination of an uplink transmission, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1A, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the third generation partnership program ("3GPP") specifications. In another implementation, the RAN 120 is compliant with the long term evolution ("LTE") system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a protocol data unit ("PDU") session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110. Note that during new radio ("NR") unlicensed ("NR-U") operation, the base unit 110 and the remote unit 105 communicate over unlicensed radio spectrum.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In certain embodiments, the mobile core network 140 may also include a Network Repository Function ("NRF") (used by the various NFs to discover and communicate with each other over application programming interfaces ("APIs")), an Authentication Server Function ("AUSF"), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single network slice selection assistance information ("NSSAI") ("S-NSSAI"), while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1A for ease of illustration, but their support is assumed.

Although specific numbers and types of network functions are depicted in FIG. 1A, one of skill in the art will recognize that any number and type of network functions may be included in the mobile core network 140. Moreover, where the mobile core network 140 is an EPC, the depicted network functions may be replaced with appropriate EPC entities, such as a mobile management entity ("MME"), serving gateway ("SGW"), packet data network gateway ("PGW"), HSS, and the like. In certain embodiments, the mobile core network 140 may include an authentication authorization accounting ("AAA") server.

While FIG. 1A depicts components of a 5G RAN and a 5G core network, the described embodiments apply to other types of communication networks and RATs, including institute of electrical and electronics engineers ("IEEE") 802.11 variants, global system for mobile communications ("GSM"), general packet radio service ("GPRS"), universal mobile telecommunication system ("UMTS"), LTE variants, code division multiple access ("CDMA") 2000, Bluetooth, ZigBee, Sigfoxx, and the like. For example, in an LTE variant involving an EPC, the AMF 143 may be mapped to an MME, the SMF 145 may be mapped to a control plane portion of a PGW and/or to an MME, the UPF 141 may be mapped to an SGW and a user plane portion of the PGW, the UDM (and/or unified data repository ("UDR")) 149 may be mapped to a home subscriber server ("HSS"), etc.

In the following descriptions, the term "gNB" is used for the base station (i.e., base unit 110) but it is replaceable by any other radio access node, e.g., RAN node, eNB, BS, eNB, gNB, access point ("AP"), NR, etc. In the following descriptions, the term "UE" is used for the remote unit 105. Further the operations are described mainly in the context of 5G NR. However, the proposed solutions/methods are also equally applicable to other mobile communication systems supporting communication on unlicensed spectrum.

It should be mentioned that throughout the disclosure, the terms symbol, slot, subslot and transmission time interval ("TTI") refers to a time unit with a particular duration (e.g., symbol could be a fraction/percentage of an orthogonal frequency division multiplexing ("OFDM") symbol length associated with a particular subcarrier spacing ("SCS")).

In the following, an UL transmission (e.g., UL transmission burst) may be comprised of multiple transmissions (e.g., of the same or different priority, in case a priority is associated with the transmissions) with gaps between the transmissions, wherein the gaps are short enough in duration to not necessitate performing a channel sensing/LBT operation between the transmissions.

In the following, an UL transmission may refer to a Physical Uplink Shared Channel ("PUSCH") transmission, a Physical Uplink Control Channel ("PUCCH") transmission, Random Access Channel ("RACH") transmission, and/or an UL signal. In certain embodiments, an UL transmission may contain Uplink Control Information ("UCI"), such as Configured Grant UCI ("CG-UCI") containing information regarding the acquired COT such as COT sharing information. In certain embodiments, the UL transmission may contain Scheduling Request ("SR") or periodic Channel State Information ("CSI") or semi-persistent CSI.

Throughout the disclosure, sometimes CO and COT are used interchangeably. It should be noted that the below described embodiments, examples and implementations, may also be applicable to sidelink transmissions.

Devices/network nodes, such as gNBs, that operate in unlicensed/shared spectrum may be required to perform Listen Before Talk ("LBT," also referred to as channel sensing) prior to being able to transmit in the unlicensed spectrum. If the device/network node performing LBT does not detect the presence of other signals in the channel, the medium/channel is considered for transmission.

Figure 1B:
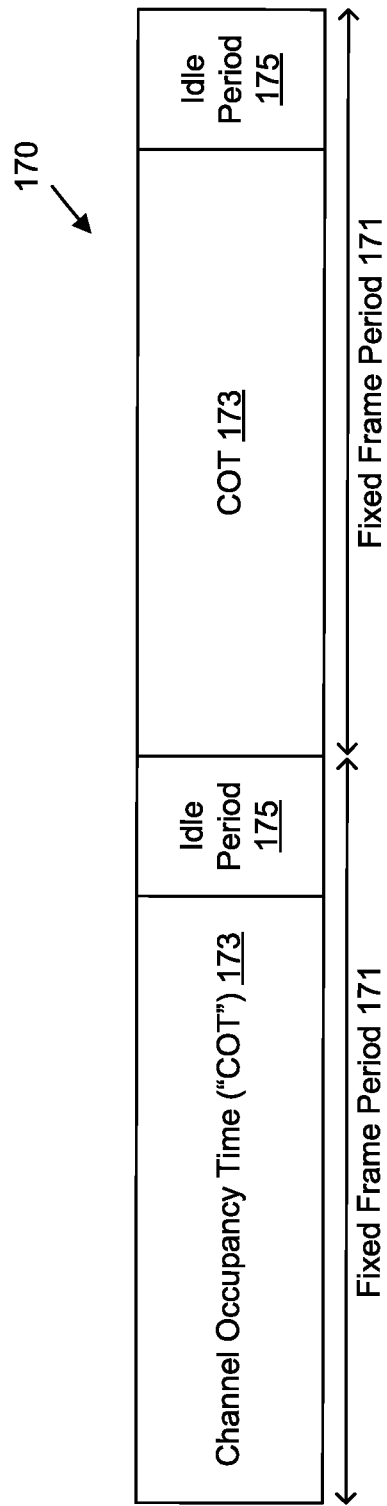
FIG. 1B depicts a diagram illustrating one embodiment a fixed frame period structure.

FIG. 1B depicts one embodiment of a Fixed Frame Period structure 170. A Fixed Frame Period 171 is comprised of a Channel Occupancy Time ("COT") 171 and an idle period 175. In FBE (frame based equipment) mode of operation, the UE or gNB performs LBT in an idle period 173 and once acquires the channel/medium, the UE or gNB can communicate within the non-idle time of a fixed frame period duration (referred to as channel occupancy time ("COT") 173). In current specifications/regulations, the idle time 175 is not to be shorter than the maximum of: 5% of the FFP 171, and 100 microseconds ("µs").

Regarding unlicensed/shared spectrum technology, the following terminologies are defined:

A "channel" refers to a carrier or a part of a carrier consisting of a contiguous set of resource blocks ("RBs") on which a channel access procedure is performed in shared spectrum.

A "channel access procedure" refers to a sensing-based procedure that evaluates the availability of a channel for performing transmissions. The basic unit for sensing is a sensing slot with a duration $T_{sl}=9$ µs. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A "channel occupancy" refers to transmission(s) on channel(s) by eNB(s)/gNB(s) or UE(s) after performing the corresponding channel access procedures, e.g., as described in 3GPP TS 37.213.

A "Channel Occupancy Time" refers to the total time for which the initiating eNB/gNB or UE and any eNB(s)/gNB(s) or UE(s) sharing the channel occupancy perform transmission(s) on a channel, i.e., after an eNB/gNB or UE performs the corresponding channel access procedures described in this clause. For determining a Channel Occupancy Time, if a transmission gap is less than or equal to 25 µs, the gap duration is counted in the channel occupancy time. A channel occupancy time can be shared for transmission between an eNB/gNB and the corresponding UE(s).

A "DL transmission burst" is defined as a set of transmissions from an eNB/gNB without any gaps greater than 16 µs. Transmissions from an eNB/gNB separated by a gap of more than 16 µs are considered as separate DL transmission bursts. An eNB/gNB may transmit transmission(s) after a gap within a DL transmission burst without sensing the corresponding channel(s) for availability.

A "UL transmission burst" is defined as a set of transmissions from a UE without any gaps greater than 16 µs. Transmissions from the same UE which are separated by a gap of more than 16 µs are considered as separate UL transmission bursts. A UE may transmit subsequent transmission(s) after a gap within a UL transmission burst without sensing the corresponding channel(s) for availability.

A UE may perform channel sensing and access the channel if it senses the channel to be idle. UE-initiated COT may be especially useful in low-latency applications, wherein the UE having UL data to be sent in configured grant resources is allowed to initiate a COT. Sometimes, it is useful to share the acquired COT with the gNB, such that gNB could schedule DL or UL for the same UE or for other UEs.

Note that a UE may have up to 12 simultaneously active configured grants for a bandwidth part ("BWP") of a serving cell. Each configured grant may have a physical layer priority indicator (e.g., phy-PriorityIndex-r16). In certain embodiments, a single configured grant can be activated via a DCI, and multiple configured grants can be deactivated/released simultaneously via a DCI.

A UL cancellation indication ("ULCI") is an indication sent in a group common Physical Downlink Control Channel ("PDCCH") (DCI format 2_4) for each serving cell and the indication indicates a set of time-frequency resources wherein the UE should be muted.

Regarding when a UE is allowed to initiate channel occupancy ("CO"), under certain conditions allowing only certain UEs to initiate a Channel Occupancy Time ("COT") at the beginning of a frame period—instead of allowing a large number of UEs (or most UEs capable of UE COT initiation) to initiate a COT—may have certain advantages, as discussed below with reference to FIGS. 2 and 3.

Figure 2:
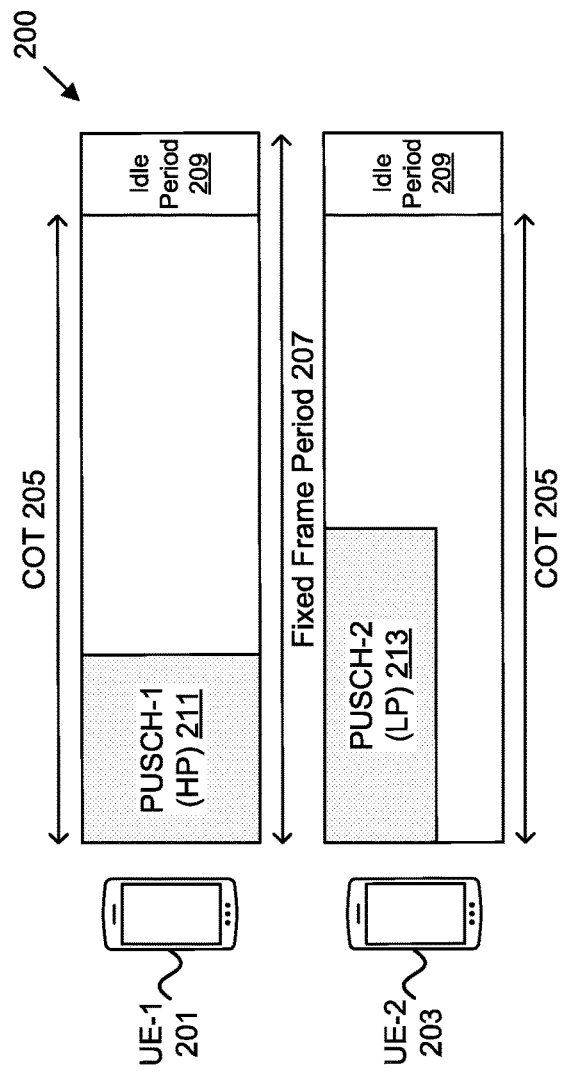
FIG. 2 depicts a diagram illustrating one embodiment of allowing UEs only with high priority (HP) data/control to initiate a COT.

FIG. 2 depicts an example frame structure 200 of a set of UEs, according to embodiments of the disclosure. The frame structure 200 is shared by a first UE (i.e., "UE-1") 201 and a second UE (i.e., "UE-2") 203 where the UE-1 201 has high priority ("HP") data to transmit and the UE-2 203 has low priority ("LP") data at the beginning of a COT 205 of a FFP 207. Note that the FFP 207 comprises the COT 205 and an idle period 209. Here, the UE 201 and UE 203 are embodiments of the remote unit 105, described above.

Note that if the UE-1 201 and UE-2 203 both attempt to transmit their data at the beginning of the COT 205, there may be a collision resulting in the RAN being unable to decode the HP data. Consequently, the UE-1 201 would need to retransmit the HP data, resulting in unwanted delay of the HP data and inefficient use of the radio interface.

According to a first solution, only the first UE 201 is allowed to initiate a COT during the FFP 207 due to having HP data 205 to transmit. In one example, allowing only UEs with high priority data and/or control information to initiate a COT improves network performance by allowing such UEs to use the beginning of the COT 205 to transmit their HP data/control signals. For instance, the first UE 201 may have a first PUSCH transmission 211 (i.e., containing the HP data) to be transmitted in a configured grant resource at the beginning of the FFP 207 with a PUSCH priority set to 'high' (e.g., PUSCH transmission with a priority index 1), as depicted in FIG. 2. Further assume that the second UE 203 has a second PUSCH transmission 213 (i.e., containing the LP data) to be transmitted in a configured grant resource at the beginning of the FFP 207 with a PUSCH priority set to 'low' or without a PUSCH priority signaled for the PUSCH transmission (e.g., PUSCH transmission with a priority index 0).

Both the first and second UEs 201, 203 compete for the channel. Assuming both UEs 201, 203 using the same Listen-Before-Talk ("LBT") Bandwidth ("BW"), the UEs 201, 203 would both sense the channel free and transmit on the channel leading to collision. In one implementation, the time-frequency resources of the first PUSCH transmission 211 and the second PUSCH transmission 213 overlap. For instance, assume that the first PUSCH transmission 211 is to be transmitted in a BW of 20 MHz and the second PUSCH transmission 213 is to be transmitted in a BW of 16 MHz (or some other BW that satisfies a minimum channel occupancy BW), where the BWs overlap.

In such a case, the HP data 205 (e.g., associated with a low-latency communication and/or ultra-reliable low-latency communication ("URLLC")) would be delayed due to collision. However, if only UEs with high priority data were permitted to initiate a COT, then there would not be a collision between the PUSCH transmissions 211, 213 of the first UE 201 and the second UE 203 (e.g., because the second UE 203 does not perform channel access procedure and cannot initiate a COT), and the first UE 201 would be able to transmit its high priority PUSCH transmission 211.

However, if the first PUSCH transmission 211 and the second PUSCH transmission 213 do not overlap in frequency, then both the first UE 201 and the second UE 203 are able to send their transmissions at the beginning of the FFP 207 without collision. Accordingly, when both first PUSCH transmission 211 and second PUSCH transmission 213 are high priority PUSCH, the first UE 201 and second UE 203 may be use non-overlapping time-frequency resources to prevent collision.

In one embodiment, UL interlace structure (e.g., using UL frequency resource allocation type 2) may be used to prevent time-frequency resource overlap. A PUSCH is transmitted in a set of frequency interlaces (each containing one or more contiguous RBs as described in section 6.1.2.2.3 of TS 38.214, for instance. To avoid frequency overlap, the first PUSCH transmission 211 and the second PUSCH transmission 213 may be transmitted in Resource Blocks ("RBs") of different sets of interlace indices. In one implementation, both the first PUSCH transmission 211 and the second PUSCH transmission 213 use the LBT BW of 20 MHz, but the first PUSCH transmission 211 uses only even-numbered RBs, while the second PUSCH transmission 213 uses only odd-numbered RBs. Thus, both the first PUSCH transmission 211 and the second PUSCH transmission 213 occupy 20 MHz in a distributed fashion.

In another embodiment, time-frequency resource overlap is prevented by having the first PUSCH transmission 211 and the second PUSCH transmission 213 sent in different LBT bandwidths. In yet another embodiment, time-frequency resource overlap is prevented by reducing the channel occupancy BW of the first and second PUSCH transmissions 211, 213 so that the transmissions occupy a non-overlapping portion of the channel (i.e., LBT) bandwidth. Here, there is no minimum channel occupancy BW requirement to be satisfied.

Figure 3:
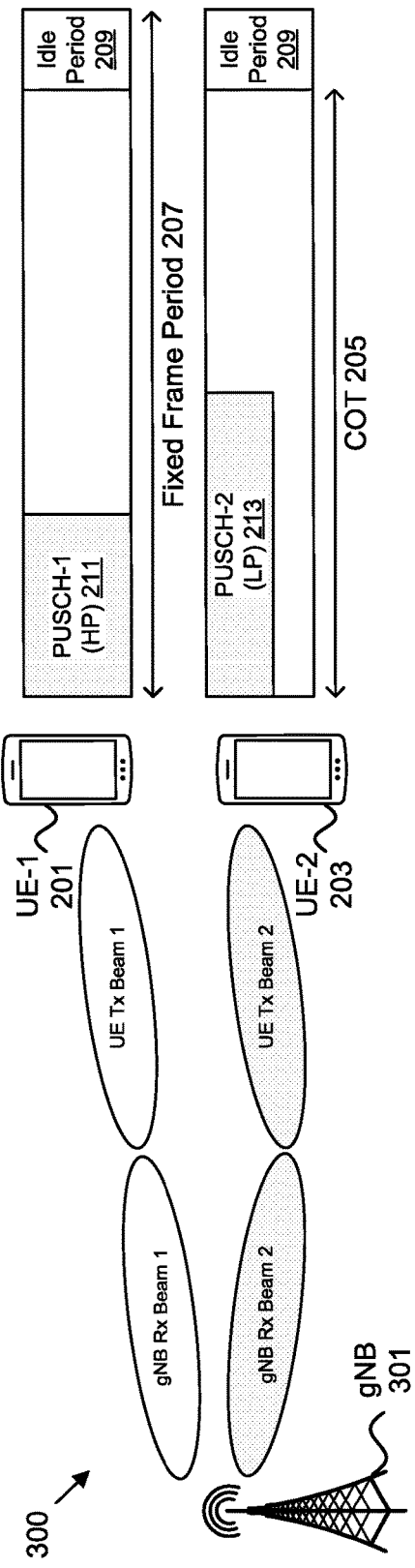
FIG. 3 depicts a diagram illustrating one embodiment of a network deployment where two or more UEs are allowed to initiate COT.

FIG. 3 depicts an example network deployment 300, according to embodiments of the disclosure. The network deployment 300 includes a gNB 301, the first UE 201 and the second UE 203, where first UE 201 has HP data and the second UE2 has LP data at the beginning of a COT/FFP, such as the COP 205 in the FFP 207. Here, the gNB 301 may be one embodiment of the base unit 110.

According to a second solution, both the first UE 201 and second UE 203 are allowed to initiate COT as the gNB 301 is able to receive signals/transmissions from both UEs 201, 203 on different receive ("RX") beams, respectively. In another example, if multiple UEs have either same or different priority of data to be transmitted on their respective configured grant ("CG") resources that may have at least partially overlapping time-frequency resources, wherein each of the CG resources for each of the UEs is also configured with a spatial relation information (for example, using a Transmission Configuration Indicator ("TCI") index), then the gNB 301 allows only those UEs to initiate COT that can be received by the gNB 301 on different set of Receive ("Rx") beams at the same time.

For example, as shown in FIG. 3, the first UE 201 is transmitting the first PUSCH transmission 211 on its Transmit ("TX") beam 1 (i.e., based on configured and/or indicated TCI index for a first configured grant of the first UE 201) and the second UE 203 is transmitting the second PUSCH transmission 213 on its TX beam 2 (i.e., based on configured and/or indicated TCI index for a first configured grant of the second UE 203), then the gNB 203 is able to receive both separate beams, i.e., on its Rx beam 1 and RX beam 2, respectively. In one example, the source reference signal ("RS") associated with the spatial relation information/TCI state is different for the first UE 201 and the second UE 203, e.g., corresponding to different receive beams at the gNB 301. In another example, the source reference signal associated with the spatial relation information and/or TCI state is same for the first UE 201 and second UE 203, e.g., corresponding to same receive beam(s) at the gNB 301, but where the time-frequency resources for the first UE 201 and second UE 203 do not overlap.

In a first embodiment, a UE may be enabled to initiate a COT under one or more of the following rules: 1) Rule #1: the UE has an UL transmission (e.g., pending UL transmission) in a configured grant resource that occurs at a beginning of a frame period; and 2) Rule #2: the UE has an UL transmission in a configured grant resource which occurs at most 'x' symbols after the beginning of a frame period. In one example of Rule #2, 'x' is determined based on a UE capability indication, based on RRC signaling, or indicated in DCI in a previous FFP (e.g., immediately preceding FFP). In another example of Rule #2, the UL transmission is a first UL transmission, and the UE may initiate a COT if the UE has a second UL transmission with resources overlapping at least in time with the first UL transmission and the resources of the second UL transmission start from the beginning of the FFP.

Figure 4:
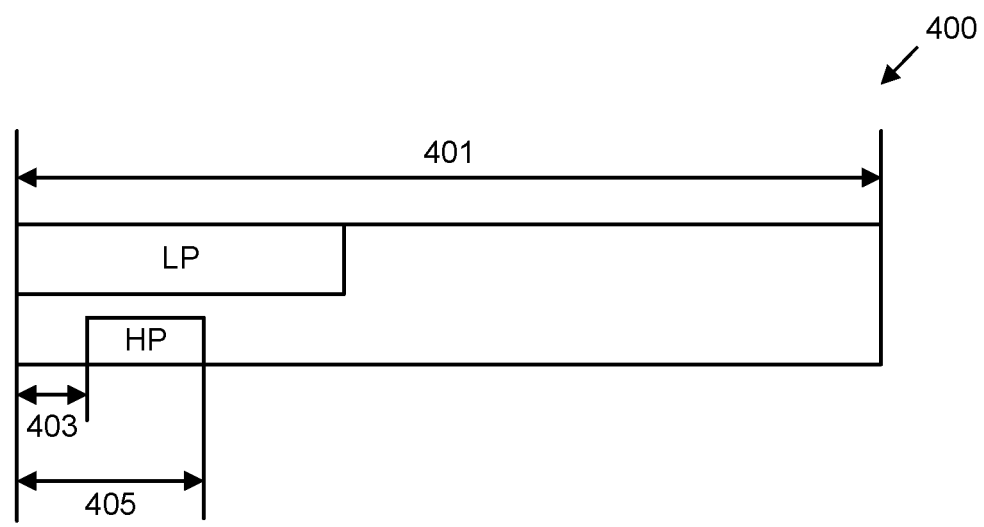
FIG. 4 depicts a diagram illustrating one embodiment of a UL transmission burst.

FIG. 4 depicts a diagram 400 illustrating one embodiment of a UL transmission burst. Specifically, FIG. 4 depicts a low priority ("LP") transmission and a high priority ("HP") transmission in an FFP 401. The HP transmission is x symbols 403 after the start of the FFP 401, and an UL burst 405 ends at the end of the HP transmission. Thus, the UL burst 405 is from the beginning of the FFP 401 at least till the end of the HP UL transmission, according to one example of Rule #2. In FIG. 4, a first UL transmission is a HP PUSCH transmission in a configured resource and a second UL transmission is a LP PUSCH transmission in another configured resource. The UE transmits at least the first UL transmission and at least a portion of the second UL transmission.

Figure 5:
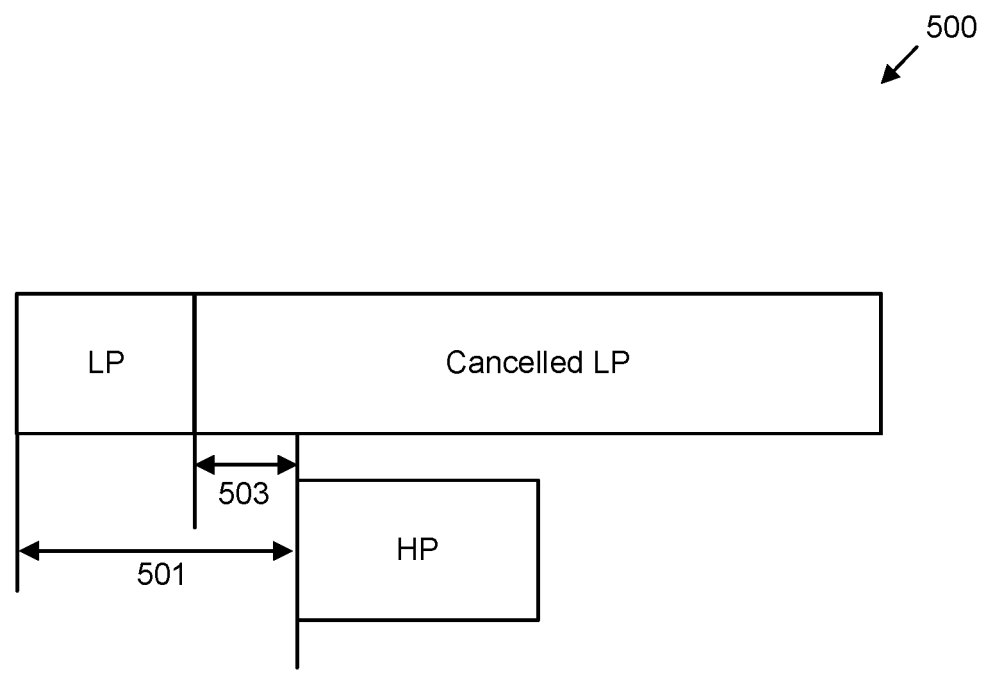
FIG. 5 depicts a diagram illustrating one embodiment of a UE transmitting LP data prior to transmitting HP data.

FIG. 5 depicts a diagram 500 illustrating one embodiment of a UE transmitting LP data prior to transmitting HP data. Specifically, FIG. 5 depicts a LP transmission, a canceled LP transmission portion, and a HP transmission in an FFP. The HP transmission is x symbols 501 after the start of the LP transmission, and there is a gap 503 between the LP transmission and the HP transmission. Indeed, FIG. 5 depicts an example scenario in which a UE transmits its LP UL transmission at least till the gap 503 between the LP transmission and the HP transmission (e.g., the gap 503 may be less than the gap for which sensing is required (e.g., 16 μs) according to one example of Rule #2).

In one embodiment, the UE is required not to cancel the LP transmission (a first UL transmission) earlier than a gap between the LP transmission and the HP transmission (a second UL transmission), where the gap is less than the gap for which sensing is required (e.g., 16 µs, see FIG. 5). In another embodiment, the UE may cancel the LP transmission (first UL transmission) earlier than the sensing required gap value from the start of the HP transmission (second UL transmission) and may transmit a reservation signal (e.g., a reference signal) to avoid sensing the channel, until at least after the start of the HP transmission less the sensing required gap value or the UE may extend a cyclic prefix ("CP") of the first symbol (e.g., of the HP transmission) that is located before the configured resource associated with the HP transmission.

In some embodiments, the UE may transmit the LP transmission and the HP transmission at the same time if the LP transmission and the HP transmission do not overlap in frequency (e.g., using resource blocks ("RBs") corresponding to different interlace indices).

In various embodiments, the LP transmission and the HP transmission are associated with the same UE TX beam and/or the same gNB RX beam (e.g., the same source reference signal for spatial relation information and/or a TCI state for the LP transmission and the HP transmission).

In certain embodiments, the LP transmission and the HP transmission are associated with different UE TX beams, antenna arrays, and/or antenna panels.

In some embodiments, a gNB indicates (e.g., in a DCI in a most recent and/or previous FFP) a list of spatial relation source references RS (e.g., gNB RX beam—the gNB uses the same spatial filter for receiving as that used for transmitting the spatial relation reference signal), and the UE has an UL transmission (e.g., pending UL transmission) in a configured grant resource that occurs at or at most 'x' symbols after the beginning of a frame period with a spatial relation reference RS corresponding to the UL transmission from the indicated list of spatial relation source references RS.

Referring again to the rules under which a UE is allowed to initiate a COT, there may be a Rule #3 in which the UE has a first UL transmission in a first configured grant resource that occurs at most 'g1' time units after a second UL transmission in a second configured grant resource starting from the beginning of the FFP. In one example, 'g1' time units is less than a threshold for which the UE needs to perform channel sensing before transmission of the first UL transmission after the transmission of the second UL transmission.

Figure 6:
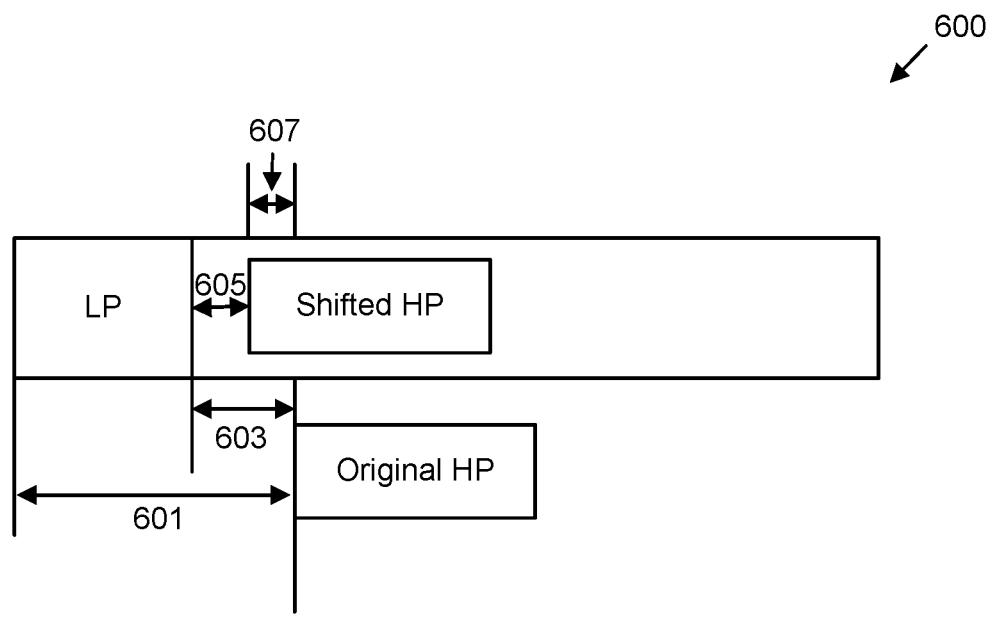
FIG. 6 depicts a diagram illustrating one embodiment of a shifted high priority transmission.

FIG. 6 depicts a diagram 600 illustrating one embodiment of a shifted high priority transmission. Specifically, FIG. 6 depicts an LP transmission, an original HP transmission, and a shifted HP transmission in an FFP. The original HP transmission is x symbols 601 after the start of the LP transmission. There is a gap 603 (g1) between the LP transmission and the original HP transmission, a gap 605 (g2) between the LP transmission and the shifted HP transmission, and an offset 607 (t) is between the start of the shifted HP transmission and the start of the original HP transmission. Indeed, FIG. 6 depicts an example of a shifted high priority transmission 600 where the gap 605 g2 does not require channel sensing after the LP transmission, according to one example of Rule #3. In some embodiments of Rule #3, to avoid performing channel sensing and/or LBT (e.g., Cat 2 LBT or Cat 4 LBT) for transmitting the first UL transmission (e.g., HP transmission in FIG. 6), the UE transmits the first UL transmission earlier (e.g., by applying a time offset 't' to the first configured grant resource) leading to no gap and/or a small gap g2 after the second UL transmission (e.g., see FIG. 6).

In certain embodiments, for a gNB to able to decode a shifted transmission, it may be expected to apply a rule for receiving a high priority CG as follows: if within a UE initiated FFP, there may be a low-priority CG and if it is followed by a high priority CG but with a gap greater than a value required to perform channel sensing again, then the gNB may expect that the UE started the transmission of high-priority CG earlier such that the gap is reduced to at most 'g2' time units (in FIG. 6). In one example, 't' may be determined such that the first UL transmission starts from the next available UL symbol and/or slot after the second UL transmission.

Figure 7:
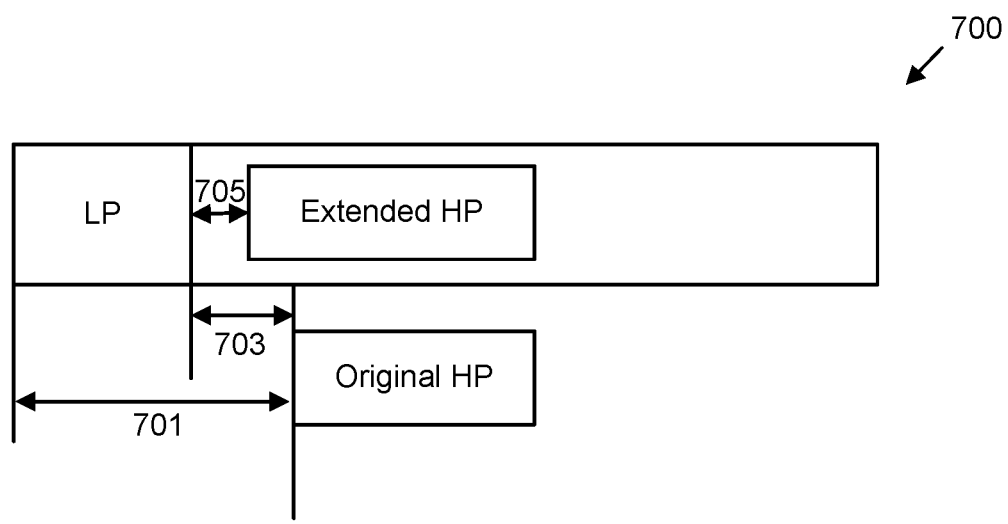
FIG. 7 depicts a diagram illustrating one embodiment of an extended high priority transmission.

FIG. 7 depicts a diagram 700 illustrating one embodiment of an extended high priority transmission. Specifically, FIG. 7 depicts an LP transmission, an original HP transmission, and an extended HP transmission in an FFP. The original HP transmission is x symbols 701 after the start of the LP transmission. There is a gap 703 (g1) between the LP transmission and the original HP transmission, and a gap 705 (g2) between the LP transmission and the extended HP transmission. Indeed, FIG. 7 depicts an example of extended high priority transmission where the gap 705 g2 does not require channel sensing after LP transmission, according to one example of Rule #3. In one embodiment of Rule #3, the CP associated with the first UL transmission is increased to avoid performing channel sensing (see FIG. 7). In one example, the CP is increased only if 'g1' is small enough that with a CP increase the gap may be shrunk to 'g2' that is shorter than the gap required for sensing between transmission bursts.

Referring again to the rules under which a UE is allowed to initiate a COT, Rule #4: gNB indicates (e.g., in a DCI or medium access control ("MAC") control element ("CE") ("MAC-CE") in a most recent and/or previous FFP) a list of spatial relation source references RS (e.g., gNB Rx beam— the gNB uses the same spatial filter for receiving as that used for transmission the spatial relation reference signal), and the UE has an UL transmission (e.g., pending UL transmission) in a configured grant resource that occurs at or at most 'x' symbols after the beginning of a frame period with a spatial relation reference RS corresponding to the UL transmission being from the indicated list of spatial relation source references RS. Thus, the gNB may indicate to UEs with an UL transmission using a spatial transmission filter that is the same as that used for receiving one of the reference signals from the list of spatial relation references RS enabled that they are allowed to initiate a COT.

In one embodiment, a list of spatial relation source references RS may be applicable to all slots in an FFP. In another embodiment, a first reference RS in a list of spatial relation source references RS is applicable to a first slot in the FFP, a second reference RS in the list of spatial relation source references RS is applicable to a second slot in the FFP, and so forth with modulo or repetition mapping. For example, with modulo mapping, reference RS (e.g., m mod N) is applicable to slot m, with N being the number of RS in the list. With repetition mapping, reference RS (e.g., floor (m/P) mod N) may be applicable to slot m, with N being the number of RS in the list, and P being a repetition of the RS in successive slots (e.g., same gNB beam for P successive slots).

In some embodiments, a list of spatial relation source references RS may include a list of groups of reference RS (e.g., simultaneous RX beams at gNB-associated with different gNB antenna arrays, panels, and/or transmission and reception points ("TRPs")). A first group of RS in the list may be applicable to a first slot in an FFP, a second group of RS in the list of spatial relation source references RS may be applicable to a second slot in the FFP, and so forth with modulo or repetition mapping. For example, a RS (e.g., m mod N) may be applicable to slot m, with N being a number of RS in the list.

In various embodiments, a number of symbols instead of a slot may be used. The number of symbols indicate which spatial relations may be applicable to and/or which modulo or repetition mapping to apply to the UE (e.g., in the DCI and/or MAC-CE indicating the list of the spatial relation RS). In one example, the UL transmission is a PUSCH transmission. In another example, the UL transmission is a PUSCH transmission with PUSCH priority set to 'high'. In a further example, the UL transmission is a periodic and/or semi-persistent SRS transmission. In one example, the UL transmission is a periodic and/or semi-persistent SRS transmission with SRS priority set to 'high', and the SRS priority is part of the SRS configuration or indicated in a DCI activating semi-persistent SRS transmissions. In another example, the configured grant resource is associated with a configured grant configuration with a priority set to 'high' (e.g., phy-Priority Index set to 'p1'). In a further example, the configured grant resource is associated with a configured grant configuration, wherein a field in the CG configuration indicates that the UE may initiate a COT.

In certain embodiments, one or more of the rules described herein and values (e.g., x, t, g1, g2) may be determined via: 1) higher layer signaling (e.g., RRC configuration, MAC-CE, and so forth); 2) physical layer signaling (e.g., DCI indication); and/or 3) UE capability indication and/or signaling (e.g., a UE may indicate whether it is capable of applying one or more of the rules described herein).

In some embodiments, a UE may be enabled to initiate a COT if the UE receives an indication from a network providing channel access parameters (e.g., ChannelAccessMode-r16='semistatic') by SIBI or a dedicated configuration. In one example, the UE is enabled to initiate a COT if the UE has indicated a capability of performing UE initiated COT to the network.

In various embodiments, regarding managing an UL burst transmission at a beginning of a UE-initiated COT for COT sharing, if COT sharing with a gNB is desired and/or enabled for the UE-initiated COT, a first UL transmission (e.g., transmission burst) sent by the UE used for initiating the COT may not take most of an acquired FFP as there may not be many time resources left for COT sharing. There may be a limit on the duration of an UL transmission following acquiring a COT by a UE.

In certain embodiments, to ensure a first UL transmit burst can be decoded at a gNB, UEs initiating a COT may transmit their first UL transmission burst after acquiring the COT with higher power than usual. In one example, the first UL transmission burst, after acquiring the UE-initiated COT, may be associated with a first power offset value and/or first power control parameters (e.g., Po (open-loop power spectral density ("PSD") level), alpha (pathloss compensation factor)). The first power offset value and/or the first power control parameters may be used only if an UL transmission burst is the first UL transmission burst after acquiring the UE-initiated COT.

Figure 8:
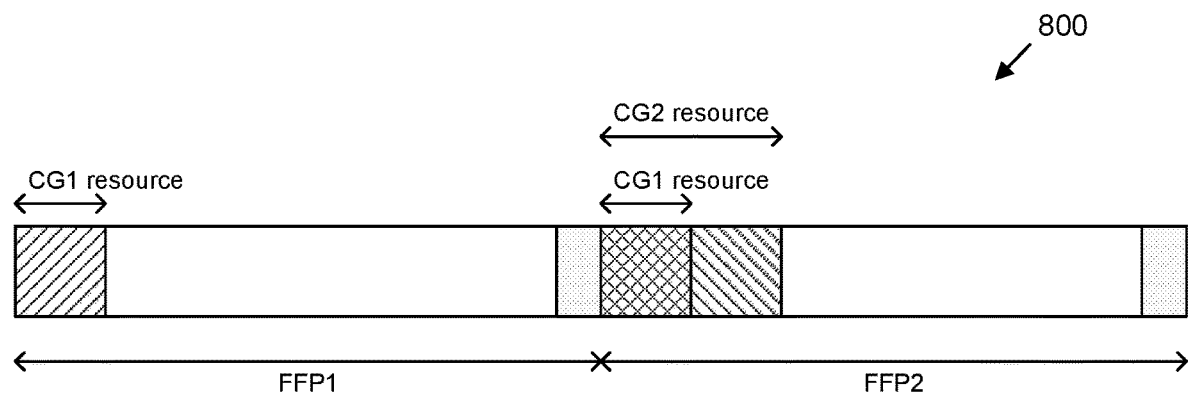
FIG. 8 depicts a diagram illustrating one embodiment of overlapping configured grant resources.

FIG. 8 depicts a diagram 800 illustrating one embodiment of overlapping configured grant resources. Specifically, diagram 800 includes a first FFP (FFP1) and a second FFP (FFP2). FFP1 includes a first CG resource (CG1), and FFP2 includes a first CG resource (CG1) and a second CG resource (CG2). Resources of CG1 and CG2 overlap in FFP2 due to having different periodicities. In certain embodiments, such as in URLLC, a UE may have up to 12 active CG configurations per BWP. Theses CG configurations have their own periodicities (e.g., defined per each CG configuration (ConfiguredGrantConfig)). Due to having different periodicities, the resources associated with two CG configurations may collide as shown in FIG. 8.

In a first implementation of a second embodiment, a UE may have a first active configured grant CG1 and a second active configured grant CG2, wherein: 1) CG1 and CG2 are simultaneously active in the same BWP: 2) a first transmission occasion ("TO") of CG1 (TO1) and a second TO of CG2 (TO2) overlap at the beginning of an FFP (e.g., in a first slot at the beginning of a FFP): 3) TO1 is shorter than TO2 (see FIGS. 8); and 4) the UE has a transport block ("TB") to transmit in one of TO1 or TO2. Accordingly, the UE transmits the TB in TO1.

In some configurations of the second embodiment, the TB is a new TB. In another configuration of the second embodiment, the TB is a retransmission of a previous TB (e.g., if cg-RetransmissionTimer is configured for at least one of CG1 and CG2 or configured for the HARQ process associated with the TB, and the timer is expired). In various configurations of the second embodiment, the UE transmits in FFP2 using CG1 resource after grabbing the channel via sensing in an idle period (e.g., at the end of FFP1). In certain configurations of the second embodiment, the UE transmits the TB in TO1 if the CG1 and CG2 have the same transport block size ("TBS"). In some configurations of the second embodiment, the UE may not transmit and/or is not expected to transmit the TB in TO2. Such UE operation may be different than other configurations in which retransmissions with the same HARQ process may be performed on any configured grant configuration if the configured grant configurations have the same TBS.

In certain configurations of the second embodiment, the UE transmits the TB in TO1 if TO1 and TO2 have the same redundancy version ("RV"). In some configurations of the second embodiment, the UE decides on which TO from TO1 and TO2 to use if both TO1 and TO2 are shorter than a threshold. Such configurations may be useful if both TO1 and TO2 are short enough to not take most of the FFP, and leave room for the gNB to schedule other DL and/or UL communications for the UE or for other UEs. The threshold may be indicated to the UE via dedicated configuration, via SIBI message, via activation DCI for each CG, via MAC CE, and so forth.

Figure 9:
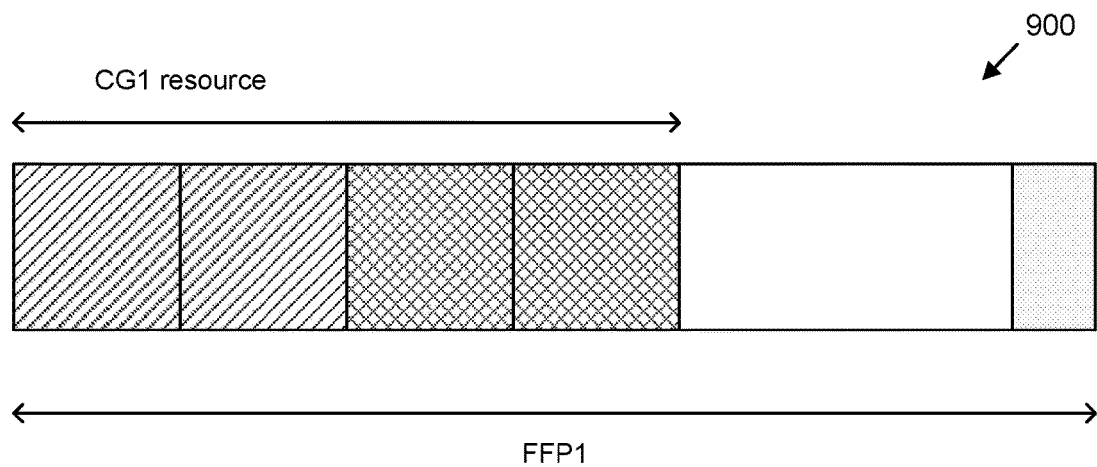
FIG. 9 depicts a diagram illustrating one embodiment of a fixed frame period.

FIG. 9 depicts a diagram 900 illustrating one embodiment of a fixed frame period. Specifically, diagram 900 includes a first FFP (FFP1). FFP1 includes a first CG resource (CG1) associated with 4 repetitions, a new TB is transmitted using the two repetitions (e.g., one initial transmission and one repetition), K1=4 and K=2. In a second implementation of the second embodiment, a UE has a first active CG1, and the UE has a TB (e.g., a new TB or retransmission of a previous TB) to transmit in a transmission resource of CG1. A number of repetitions to be applied to the TB is a first number 'K1', where the transmission resource of CG1 occurs at the beginning of an FFP.

If the UE is successful in initiating a CO (e.g., accessing the FFP), the UE transmits the TB in part of the transmission resource (e.g., starting from the beginning of the COT), and repeats the TB up to K times, wherein "K<=K1". An example is shown in FIG. 9 where K1=4 and K=2.

The parameter K1 may be indicated via RRC as part of CG1 configuration or indicated in DCI activating the CG1 configuration for type 2 configured grant. In one implementation of the second embodiment, the UE terminates the UL transmission after K repetitions.

The parameter K may be indicated or determined via: 1) RRC, such as CG1 configuration: 2) a DCI such as the DCI activating the CG1 or a DCI with a DCI format, wherein the DCI is sent in a previous FFP (e.g., the DCI is sent within the last 'x' symbols, slots, subslots, and/or time units before the end of the previous FFP (e.g., the idle time of the FFP): or 3) a difference or a fraction of K1, such as two repetitions less (e.g., lower-bounded by K=1 repetition) or half the value of K1 (e.g., rounded up or down as necessary), where the difference or fraction may be predetermined from a configuration, a signal, or from a standard.

In a third implementation of the second embodiment, a UE that has acquired a COT may terminate its first UL transmission (e.g., transmission burst) in an acquired CO based on DCI that has been received in a prior CO. In one example, the DCI command is valid for a certain number of FFPs and/or COs (e.g., the next immediate FFP and/or CO). In another example, the DCI has a DCI format used for ULCI indication (e.g., DCI format 2_4). In certain embodiments, a time region for ULCI indication may be determined based on a periodicity of the ULCI monitoring for periodicities larger than a slot.

In one configuration, the time region includes an idle period. In another configuration, the time region does not include the idle period. In a further configuration, the time region includes the idle period, but symbols of the idle period are excluded from a set of symbols of the time region for the purpose of partitioning the set of symbols of the time region and indicating ULCI for each partition.

In some embodiments, symbols of a first 'S' slots of a second FFP is excluded from a set of symbols of the time region for the purpose of partitioning the set of symbols of the time region, and indicating ULCI for each partition. The ULCI is received in a first FFP, and the second FFP is after the first FFP (e.g., next FFP).

In one embodiment, a first time region associated with a first ULCI received in a first FFP is different than a second time region associated with a second ULCI received in the first FFP, wherein: 1) the first ULCI is applicable only to the time resources of the first FFP; and 2) the second ULCI is applicable to the time resources of a second FFP, wherein the second FFP is an FFP after the first FFP. In one example, the second time region is defined to start from the beginning of the next FFP and/or CO, and not based on the monitoring occasion in which the second ULCI is received. In another example, the time region associated with an ULCI is determined based on an indication (e.g., a field in the ULCI). The indication indicates if the time region is determined based on the monitoring occasion in which the ULCI is received, based on the periodicity of the ULCI monitoring, based on the symbols wherein the ULCI is received, and/or based on another method (e.g., the time region starts from the beginning of the next FFP and/or CO). In a further example, the first time region is a first number of slots in duration and the second time region is a second number of slots in duration, and the second number of slots is larger than the first number of slots.

In various configurations: 1) the second time region is 'm' times of the first time region: 2) a first number of partitions of the first time region is indicated in a first RRC message (e.g., indicated by timeGranularityforCI as part of ULCI configuration UplinkCancellation): 3) a second number of partitions of the second time region is equal to the first number of partitions (e.g., leading to more symbols within a partition compared to the number of symbols within a partition of the first time region), wherein 'm': is a) indicated in an RRC message (e.g., in UplinkCancellation configuration, and is only applicable for a shared spectrum or FBE mode—if the UE receives ULCI in the shared spectrum); or 2) indicated in the ULCI. In one example, a new field or some of the bits of ULCI (e.g., such as first and/or last 'x' bits of the indication or those used for frequency indication) may be used. 'x' can be fixed in a specification, or may be configurable.

In a fourth implementation of the second embodiment, a UE skips a first CG configuration, and transmits on a second CG configuration if PUSCH occasions of the second CG configuration end earlier than those of the first CG configuration unless the UL transmission associated with the first configuration has a high priority.

Figure 10:
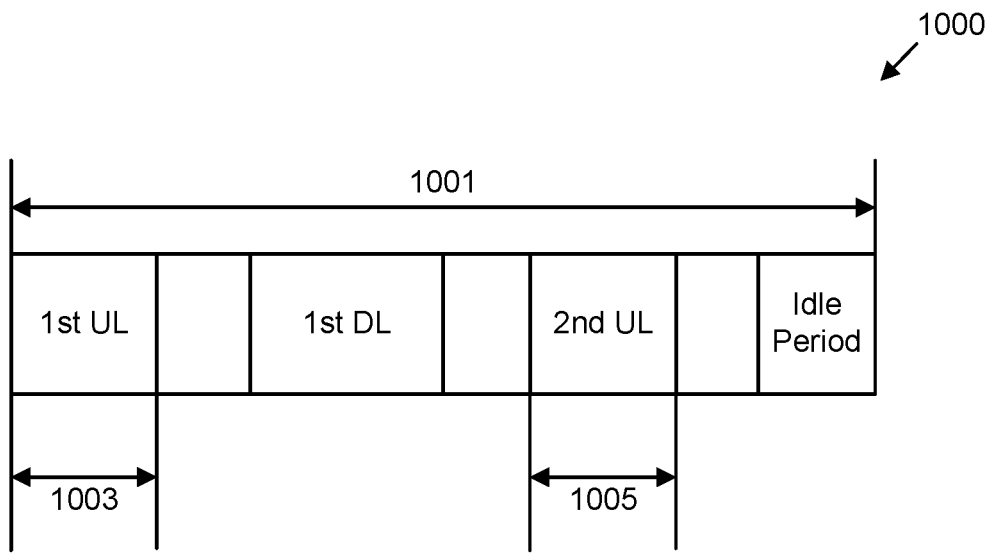
FIG. 10 depicts a diagram illustrating one embodiment of a UE transmitting multiple UL bursts.

FIG. 10 depicts a diagram 1000 illustrating one embodiment of a UE transmitting multiple UL bursts over an FFP 1001. The UL bursts include a 1st UL 1003 on a first CG resource (CG1 resource 1) with a TX power P1, and a 2nd UL 1005 on a second CG resource (CG1 resource 2) with a TX power P2. A UE, after acquiring COT, transmits in CG1 resource 1 (e.g., first UL transmission burst) with power P1 and transmits in CG1 resource 2 (e.g., a later UL transmission burst) with power P2. In a fifth implementation of the second embodiment, a UE performs configured grant PUSCH transmissions (see FIG. 10) with a first transmission power (P1) after acquiring the COT for a first time duration, and with a second transmission power (P2) after reception of DL signals from gNB within the COT. In one example, the first transmission power is higher than the second transmission power (P1>=P2). In another example, the first transmission power is derived based on the second transmission power (e.g., P1=P2+d), wherein "d" is fixed in a specification, derived based on a UE capability, RRC configured, and/or indicated by DCI. Having "P" higher than "P2" may be useful to facilitate a gNB getting a configured grant UL transmission for a first time duration.

In one example, P1>=P2 if the first UL transmission burst after acquiring and/or initiating a CO is of 'high priority' (e.g., the higher layer parameter phy-PriorityIndex in ConfiguredGrantConfig is set to 'p1'/high priority). In another example, the transmission power for UL transmissions (e.g., CG-UCI, PUCCH) for a first time duration after acquiring COT is different than the transmission power for UL transmissions after the first time duration.

In various embodiments, the gNB indicates a maximum number of symbols, slots, and/or transmission occasions that a UE may use for UL transmissions at the beginning of a FFP for a UE that has acquired a COT. The indication may be signaled in a DCI in a preceding FFP (e.g., the DCI is sent within the last 'x' symbols, slots, subslots, and/or time units before the end of the previous FFP and/or the idle time of the FFP), and the indication may be signaled via higher layer signaling such as RRC, MAC-CE, a CG configuration, and/or CG activating DCI.

In certain embodiments, a UE which received an ULCI for a set of resources, wherein the set of resources overlap with a UE's PUSCH transmission having an interlaced structure, may cancel an entire PUSCH including non-overlapped interlaces (or repetitions of the PUSCH which overlap with the set of resources) or may not cancel transmissions in certain interlaces.

Regarding signaling between a UE and gNB regarding UE-initiated channel occupancy, in some embodiments signaling may be exchanged between the gNB and UEs allowed to initiate a COT (e.g., one or more UEs indicating the capability of initiating a COT, UEs configured for COT initiation, and/or UEs satisfying one of the rules described in above), where the signaling indicates whether the UEs receiving the signaling are permitted to initiate a COT in a future FFP.

For example, the future FFP/COT may be an immediate FFP occurring after the current FFP/COT. As another example, the future FFP/COT may be the next 'F' FFPs/COTs after the current FFP/COT, where the value of 'F' is signaled in a DCI, is configured by RRC, is fixed in specifications, or is dependent on parameters such as FFP/COT duration, SCS, etc. In yet another example, UEs having multiple simultaneously active CG configurations in a BWP of a serving cell, may be able to initiate a COT in certain CG configurations.

In some embodiments, signaling may be exchanged between the gNB and a first UE regarding a COT acquired by a second UE. Here, the signaling indicates whether the COT is a gNB-acquired COT (also referred to as "RAN-acquired COT") or a UE-acquired COT. Note that a gNB-acquired COT may be associated with a first FFP, while a UE-initiated COT may be associated with a second FFP, different than the first.

In a first implementation of a third embodiment, an indication from the network in a first FFP is used to indicate to a COT-enabled UE (i.e., a UE allowed/enabled to initiate a COT) whether the UE is permitted to initiate a COP in a second FFP that occurs after the first FFP. In certain embodiments, the received indication is a DCI. In one example, the DCI is a group common DCI, and can use one of the existing DCI 2_x formats (i.e., where x=0, 1, 2, 3, 4, 5, 6). Alternatively, the received indication may be a Medium Access Control ("MAC") Control Element ("CE"), RRC signaling, or another indication.

In one example, the DCI is monitored not more than 'm' times in the first FFP. In one embodiment, the value of 'm' is 1. In another embodiment, the value of 'm' may be fixed in specifications. In certain embodiments, the value of 'm' depends on the FFP duration (e.g., gNB-acquired FFP/CO duration, or UE-initiated FFP/CO duration, where the gNB-acquired FFP/COT duration and UE-initiated FFP/COT durations are different). In other embodiments, the value of 'm' may be RRC configured or derived based on a search space monitoring periodicity.

In one example, the DCI is monitored in one of the last slots (or subslots or monitoring occasions) of the first FFP. For instance, the DCI monitoring occasion, based on the search space wherein the DCI is monitored. Here, the DCI monitoring occasion is not more than certain time from the end of the first FFP or the idle period of the first FFP.

In one example, in a current FFP or COT, the DCI indicates that UEs having a particular transmission attribute (such as a DCI field set to a particular value or an RRC parameter set to a particular value) cannot initiate a future FFP or COT (e.g., subject to UL data presence at each UE). Alternatively, the DCI may indicate that UEs having the particular transmission attribute can initiate a future FFP/COT (e.g., subject to UL data presence at each UE).

In some embodiments, the transmission attribute may be a reference RS index or RS ID. In an example, a first index of a reference/source RS for determining quasi-co-location ("QCL") 'QCL-TypeD' assumption, TCI state, SRS Resource Indicator ("SRI"), and/or spatial relation information for UL transmission (e.g., CG-PUSCH) is indicated in a group-common DCI ("GC-DCI"). The UEs which have a second reference RS index which is the same as the first index for such determination cannot (or alternatively 'can') initiate a future FFP or COT.

In various embodiments, the reference RS may be 1) a synchronization signal ("SS") and/or physical broadcast channel ("PBCH") block of a serving cell, e.g., the serving cell indicated by higher layer parameter servingCellId if present, same serving cell as the target sounding reference signal ("SRS") otherwise. Alternatively, the reference RS may be 2) a channel state information ("CSI") RS ("CSI-RS") configured on a serving cell, e.g., the serving cell is indicated by higher layer parameter servingCellId if present, same serving cell as the target SRS otherwise. Alternatively, the reference RS may be 3) an SRS configured on uplink BWP indicated by the higher layer parameter uplinkBWP, and serving cell indicated by the higher layer parameter servingCellId if present, same serving cell as the target SRS otherwise. Alternatively, the reference RS may be 4) a DL positioning reference signals ("PRS") configured on a serving cell. Alternatively, the reference RS may be 5) an SS/PBCH block or a DL PRS of a non-serving cell indicated by a higher layer parameter.

The second reference resource ID for a UE can be determined based on the configuration of the spatial relation between the second reference RS and the target SRS, where the higher layer parameter spatialRelationInfo or spatialRelationInfoPos-r16, if configured, contains the ID of the second reference RS. In an implementation, the UEs having UL transmissions leading to the same/similar receive beams can be indicated to not initiate a COT in a future FFP.

In some embodiments, the transmission attribute may be a Priority Indicator. For instance, a GC-DCI may indicate a first Priority Indicator in a current FFP/CO. Additionally, one or more UEs may have a second Priority Indicator, e.g., as part of a CG-PUSCH configuration (such as phy-PriorityIndex as part of ConfiguredGrantConfig) or indicated in CG-activation DCI.

In certain embodiments, those UEs having the second Priority Indicator the same as the first Priority Indictor value are permitted to initiate a future COT/FFP. For example, if the first and the second Priority Indicator='1' or 'high,' then a UE with high priority configured UL transmission can initiate a future COT/FFP. Alternatively, those UEs having the second Priority Indicator the same as the first Priority Indictor value are not permitted to initiate a future COT/FFP.

In another embodiment, if the first Priority Indicator='0'/low, then all UEs can initiate a future COT/FFP irrespective of their data priority. Alternatively, if the first Priority Indicator='0'/low, then only UEs with low priority configured UL transmission can initiate a future COT/FFP.

In one embodiment, different UEs may be configured with different FFP/CO duration. In such embodiments, the DCI in a current FFP indicates whether UEs configured with a first FFP/CO duration can initiate a future (e.g., next) FFP/COT.

In a second implementation of the third embodiment, an indication in a first FFP indicates to a first UE whether the first FFP is a Type-1 FFP (i.e., a gNB-acquired CO) or a Type-2 FFP (i.e., a UE-acquired CO, e.g., CO acquired by another UE, such as a second UE which is different than the first UE). In one example, the indication indicates whether the next (i.e., subsequent) FFP is a Type-1 FFP or a Type-2 FFP. For example, when in semi-static channel access mode, a UE may operate as an initiating device, the UE may determine based on DCI (or other indication) whether a scheduled UL transmission is based on a UE-initiated COT or is a shared gNB-initiated COT.

Once the FFP type is determined based on the indication, the communication parameters, attributes, and/or procedures between the first UE and the gNB is determined based on the FFP type. In one example, the indication is a DCI. In another example, the indication is a broadcast signal, such as SIB, e.g., SIB1.

In one example, the UE is not allowed to use any CG transmission at least for a time duration from the beginning of the FFP. In another example, the UE is not allowed to use any CG transmission at least for a time duration after the reception of the indication. For instance, the time duration may be the first 'm' slots (or subslots or symbols) of the FFP (or the first 'm' slots (or subslots or symbols) after the reception of the indication). In an example, some communication operations are not possible for a UE (at least for a duration of time) if the COT is a COT that is acquired by another UE. For instance, UL communication may not be possible at the first 'T' slots (or subslots or symbols) of an FFP.

In one example, the FFP/CO duration is determined based on the FFP type. For instance, a UE-initiated CO may have a smaller duration compared to gNB acquired CO. In one example, the UE-initiated COT may be a fraction of the gNB-acquired COT, such as half duration. In one implementation, the fraction is indicated to the UE via higher layer signaling or physical layer signaling.

In one example, a UE may be configured with a first FFP duration for UE-acquired (i.e., UE-initiated) COT operation, and a second FFP duration for gNB-acquired COT operation. The UE assumes the first FFP duration when the UE acquires COT and assumes a second FFP duration otherwise. In another example, the UE assumes the first FFP duration when the UE acquires COT and assumes a second FFP duration if it detects DL signals from the gNB. In one implementation, the first FFP duration is smaller than the second FFP duration.

Having different FFP durations for a UE initiated/acquired COT and the gNB acquired COT can be useful in the case that UE is performing configured grant UL transmissions and the gNB is not able to detect the configured grant UL transmissions. Accordingly, in semi-static channel access mode an FFP duration for UE-initiated COT may be configured as the same as the FFP duration for gNB-initiated COT, as an integer multiple of the FFP duration for gNB-initiated COT, or an inter-factor of the FFP duration for gNB-initiated COT. Alternatively, the FFP duration for UE-initiated COT may be configured independently from the FFP duration of gNB-initiated COT.

Figure 11:
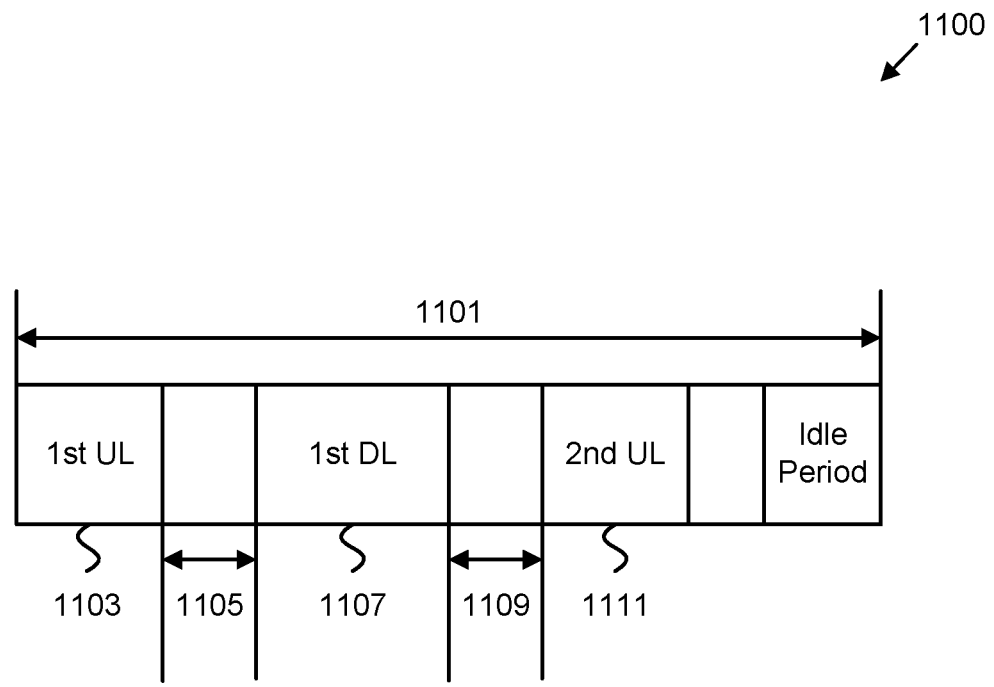
FIG. 11 is a flowchart diagram illustrating one embodiment of LBT not being required for a gap between UL transmission bursts.

FIG. 11 depicts an example scenario 1100 where LBT is not required for some gaps of an FFP 1101. Here, LBT is not required for a first gap 1105 between a first UL transmission burst 1103 and a first DL transmission burst 1107. However, LBT is required for the second gap 1109 between the first DL transmission burst 1107 and a second UL transmission burst 1111, where the first gap 1105 and second gap 1109 have the same duration, in one example, LBT category or LBT parameters are determined based on the FFP type. For instance, In certain embodiments, for FFP Type-2, LBT Category 4 is required for transmission gaps larger than 'g' microseconds between transmission bursts. Here, the value of 'g' can be defined in specifications: e.g., 25 microseconds. In certain embodiments, for FFP Type-1, LBT Category 4 is not required and only LBT Category 2 is required for transmission gaps larger than 16 microseconds. Here, LBT Category 2 refers to LBT procedure without random back-off, while LBT Category 4 refers to LBT procedure with random back-off and with an exponential contention window.

In an example, the gap between a DL transmission burst and an UL transmission burst (for which LBT is required/not required) for the FFP Type-2 can be different than that of FFP Type-1, at least in the beginning of the FFP.

In the example scenario 1100, the LBT requirement on the gap 1105 between the first UL transmission burst 1103 and the first DL transmission burst 1107 for the UE initiating the COT may be different than the LBT requirement on other gaps between UL transmissions and DL transmissions (e.g., due to location of PDCCH monitoring occasions/collision between multiple UEs initiating a same COT). For example, for the UE initiating a COT, the gap duration between the first UL transmission burst 1105 and the first DL transmission burst 1107 for which LBT is required is larger than the gap duration between subsequent UL/DL transmissions.

In one example, interpretation of some DCI fields of some DCI formats or some parameters of a DCI may depend on the FFP type. For instance, a search space periodicity of a GC-DCI that controls or provides information regarding which UEs can initiate a future COT can be once in a FFP. If FFP durations of the UE-initiated COT and gNB-acquired COT are different, then the search space periodicity wherein the GC-DCI is monitored may be different.

In one example, the UE is indicated (e.g., indicated via DCI) which slot(s) in a Type-2 FFP can be used for UL transmission. In another example, the UE is indicated (e.g., indicated in a CG configuration or via DCI activating a CG) whether the UE can acquire a COT for an uplink ("UL") transmission associated with the CG.

In a third implementation of the third embodiment, the network indicates via RRC (or via activating DCI, activating one or more CG UL configurations), the CG configuration index (indices) wherein the UE can (or cannot) initiate COT. In one implementation, a field in each CG configuration indicates whether the UE can initiate COT in resources associated with that configuration. In an example, within an FFP, the network indicates (e.g., via DCI) to the UE, CG configuration indices/or resources wherein the UE can initiate COT or UE can indicate UE acquired COT information to the network e.g., after the end of the FFP.

In a fourth implementation of the third embodiment, the UE is not expected to initiate COT in one CG of more than 'X' active/configured CGs, where 'X' is indicated by RRC, or is a UE capability.

In a fifth implementation of the third embodiment, the UE is not expected to initiate COT in a CG of the set of CGs with periodicity of less/more than 'W' symbols/slots (e.g., not too frequent CGs).

In a sixth implementation of the third embodiment, the UE can initiate COT in a CG with the associated priority set to 'high priority,' and cannot initiate COT in a CG with the associated priority set to 'low priority.'

Regarding the configuration and/or capability aspects (or attributes) of UE-initiated channel occupancy, according to a fourth embodiment, the CO duration for UE-initiated CO is determined from an indication such as RRC configuration or SIB signaling, and the CO duration is different than the CO duration of gNB-acquired CO (which can be indicated by dedicated RRC configuration). A UE may be enabled via RRC or SIB signaling to initiate a COT under certain conditions (e.g., if the UE has an UL transmission to send).

In an implementation of the fourth embodiment, the channel access priority class for channel access/sensing is determined based on one or more of the priority of UL data and priority associated with the configured grant PUSCH, and priority associated with the CG-UCI.

In another implementation of the fourth embodiment, a UE indicates (e.g., via a capability signaling) the capability of whether the UE is capable of doing UE-initiated COT, COT sharing between UL transmission and DL transmission (e.g., when UE has initiated a COT), COT sharing between configured grant and scheduled UL transmission (e.g., the UE has initiated a COT using configured grant UL transmissions) and/or COT sharing between UL transmission of a first UE and DL and/or UL transmission of another UE. The scheduled UL transmission can be on the same carrier or a supplementary carrier.

Regarding UE-specific Fixed Frame Period ("FFP"), according to a fifth embodiment, a UE served by a cell deployed in unlicensed spectrum (i.e., shared spectrum) receives a UE-specific parameter 'SemiStaticChannelAccessConfig-r17' which defines a UE-specific FFP. In one implementation, a network entity (e.g., the gNB) configures a cell-specific parameter 'SemiStaticChannelAccessConfig' to be a multiple of the UE-specific parameter 'SemiStaticChannelAccessConfig-r17' so that the UE can quickly access a channel even when a serving gNB does not share a COT.

In one implementation of the fifth embodiment, the gNB may configure the UE with the UE-specific parameter 'SemiStaticChannelAccessConfig-r17' if a low-latency application is running on the UE, or upon receiving a request from the UE. In one example, the UE receives the UE-specific parameter 'SemiStaticChannelAccessConfig-r17' in a high priority configured grant (CG) PUSCH configuration or high priority CG activation DCI.

In another implementation of the fifth embodiment, the UE may receive multiple UE-specific 'SemiStaticChannelAccessConfig-r17' parameter values via RRC signaling and may further receive a MAC-CE to activate one value from the configured multiple values or receive an indication of an activated value in CG activation DCI of Type-2 CG PUSCH.

In other implementations of the fifth embodiment, for a dynamic grant PUSCH transmission, the UE receives an indication to perform UE-initiated COT and additionally a UE-specific FFP value in a scheduling DCI (i.e., a PDCCH scheduling the PUSCH). In one example, a high priority indication in the scheduling DCI implicitly indicates the enabling of UE-initiated COT, and the UE may further look for a DCI field indicating the UE-specific FFP value in the scheduling DCI.

In certain embodiments, a UE expects that a PUSCH resource of a high priority CG PUSCH configuration starts at the beginning of an FFP. In one implementation, the UE may assume that a UE-specific FFP value is same as a PUSCH resource periodicity of the high priority CG PUSCH configuration.

Figure 12:
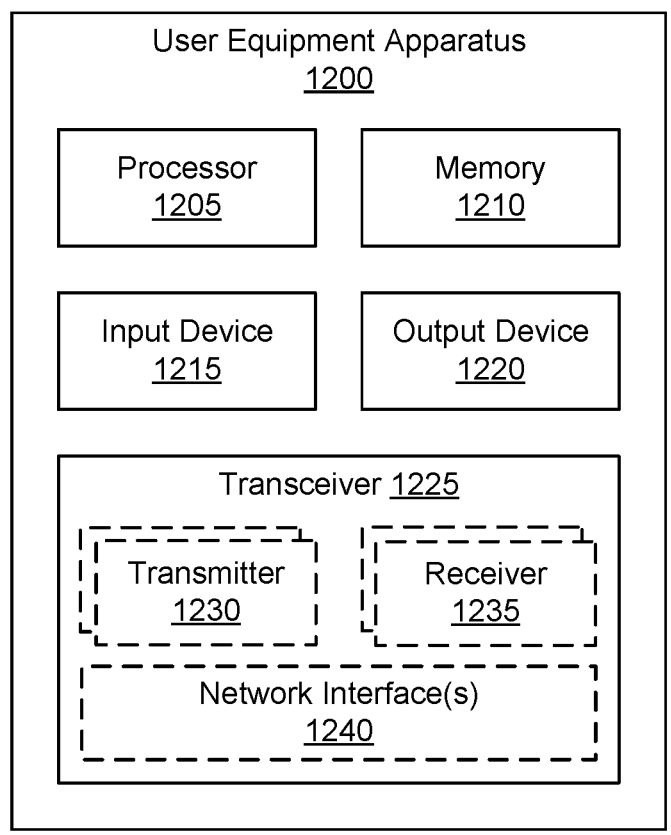
FIG. 12 is a block diagram illustrating one embodiment of a user equipment apparatus that may be used for early termination of an uplink transmission.

FIG. 12 depicts a user equipment apparatus 1200 that may be used for early termination of an uplink transmission, according to embodiments of the disclosure. In various embodiments, the user equipment apparatus 1200 is used to implement one or more of the solutions described above. The user equipment apparatus 1200 may be one embodiment of the remote unit 105 and/or the UE 1205, described above. Furthermore, the user equipment apparatus 1200 may include a processor 1205, a memory 1210, an input device 1215, an output device 1220, and a transceiver 1225.

In some embodiments, the input device 1215 and the output device 1220 are combined into a single device, such as a touchscreen. In certain embodiments, the user equipment apparatus 1200 may not include any input device 1215 and/or output device 1220. In various embodiments, the user equipment apparatus 1200 may include one or more of: the processor 1205, the memory 1210, and the transceiver 1225, and may not include the input device 1215 and/or the output device 1220.

The processor 1205, in one embodiment, may include any known controller capable of executing computer-readable instructions and/or capable of performing logical operations. For example, the processor 1205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225.

In various embodiments, the processor 1205 controls the user equipment apparatus 1200 to implement UE behavior according to one or more of the above described embodiments. In certain embodiments, the processor 1205: starts to transmit a first uplink transmission with a first duration in a beginning of a channel occupancy period: determines to terminate the first uplink transmission earlier than an end of the first duration based on: repetitions associated with the first uplink transmission: or a duration of overlapping configured grant resources, wherein the first uplink transmission can be sent in any of the overlapping configured grant resources, each of the overlapping configured grant resources is associated with a different configured grant configuration than a configured grant configuration associated with another overlapping configured grant resource; and terminates the first uplink transmission earlier than the end of the first duration in response to determining to terminate the first uplink transmission earlier than the end of the first duration.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to early termination of an uplink transmission. For example, the memory 1210 may store various parameters, configurations, policies, and the like as described above. In certain embodiments, the memory 1210 also stores program code and related data, such as an operating system or other controller algorithms operating on the apparatus 1200.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, a liquid crystal display ("LCD"), an LED display, an organic light-emitting diode ("OLED") display, a projector, or similar display device capable of outputting images, text, or the like to a user. As another, non-limiting, example, the output device 1220 may include a wearable display separate from, but communicatively coupled to, the rest of the user equipment apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 communicates with one or more network functions of a mobile communication network via one or more access networks. The transceiver 1225 operates under the control of the processor 1205 to transmit messages, data, and other signals and also to receive messages, data, and other signals. For example, the processor 1205 may selectively activate the transceiver 1225 (or portions thereof) at particular times in order to send and receive messages.

The transceiver 1225 includes at least transmitter 1230 and at least one receiver 1235. One or more transmitters 1230 may be used to provide UL communication signals to a base unit 110, such as the UL transmissions described herein. Similarly, one or more receivers 1235 may be used to receive DL communication signals from the base unit 110, as described herein. Although only one transmitter 1230 and one receiver 1235 are illustrated, the user equipment apparatus 1200 may have any suitable number of transmitters 1230 and receivers 1235. Further, the transmitter(s) 1230 and the receiver(s) 1235 may be any suitable type of transmitters and receivers.

In one embodiment, the transceiver 1225 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1225, transmitters 1230, and receivers 1235 may be implemented as physically separate components that access a shared hardware resource and/or software resource, such as for example, the network interface 1240.

In various embodiments, one or more transmitters 1230 and/or one or more receivers 1235 may be implemented and/or integrated into a single hardware component, such as a multi-transceiver chip, a system-on-a-chip, an application-specific integrated circuit ("ASIC"), or other type of hardware component. In certain embodiments, one or more transmitters 1230 and/or one or more receivers 1235 may be implemented and/or integrated into a multi-chip module. In some embodiments, other components such as the network interface 1240 or other hardware components/circuits may be integrated with any number of transmitters 1230 and/or receivers 1235 into a single chip. In such embodiment, the transmitters 1230 and receivers 1235 may be logically configured as a transceiver 1225 that uses one more common control signals or as modular transmitters 1230 and receivers 1235 implemented in the same hardware chip or in a multi-chip module.

Figure 13:
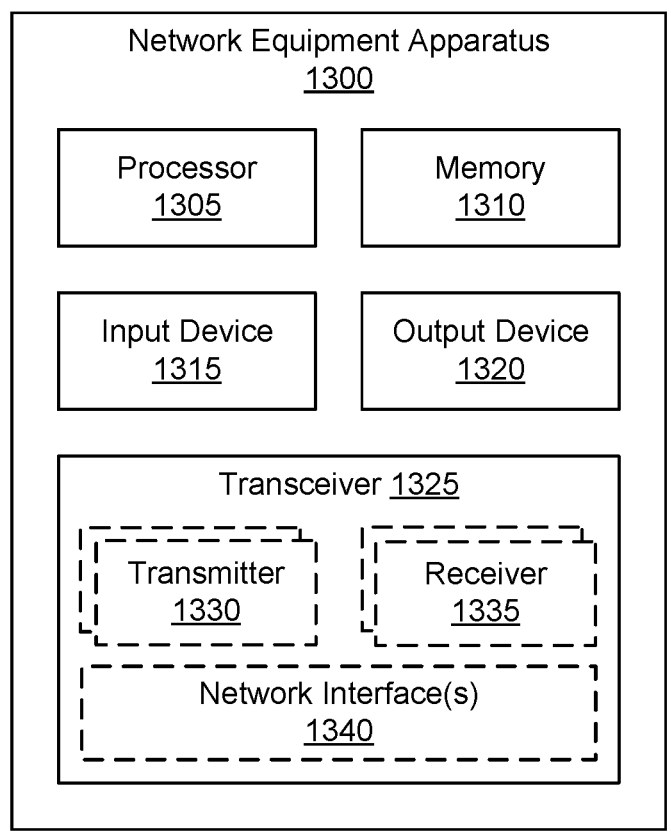
FIG. 13 is a block diagram illustrating one embodiment of a network equipment apparatus that may be used for early termination of an uplink transmission.

FIG. 13 depicts a network equipment apparatus 1300 that may be used for early termination of an uplink transmission, according to embodiments of the disclosure. The network equipment apparatus 1300 may be one embodiment of the base unit 110 or RAN node, described above. Furthermore, the base network equipment apparatus 1300 may include a processor 1305, a memory 1310, an input device 1315, an output device 1320, and a transceiver 1325. In some embodiments, the input device 1315 and the output device 1320 are combined into a single device, such as a touchscreen. In certain embodiments, the network equipment apparatus 1300 may not include any input device 1315 and/or output device 1320. In various embodiments, the network equipment apparatus 1300 may include one or more of: the processor 1305, the memory 1310, and the transceiver 1325, and may not include the input device 1315 and/or the output device 1320.

The processor 1305, in one embodiment, may include any known controller capable of executing computer-readable instructions and/or capable of performing logical operations. For example, the processor 1305 may be a microcontroller, a microprocessor, a CPU, a GPU, an auxiliary processing unit, a FPGA, or similar programmable controller. In some embodiments, the processor 1305 executes instructions stored in the memory 1310 to perform the methods and routines described herein. The processor 1305 is communicatively coupled to the memory 1310, the input device 1315, the output device 1320, and the transceiver 1325.

In various embodiments, the network equipment apparatus 1300 is a RAN node. Here, the processor 1305 controls the network equipment apparatus 1300 to perform the RAN behaviors described herein. For example, the processor 1305 may control the transceiver 1325 to send DCI as described herein. Further, the transceiver 1325 may receive hybrid automatic repeat request ("HARQ") acknowledgment ("ACK") ("HARQ-ACK") transmissions from a UE, as described herein.

The memory 1310, in one embodiment, is a computer readable storage medium. In some embodiments, the memory 1310 includes volatile computer storage media. For example, the memory 1310 may include a RAM, including dynamic RAM ("DRAM"), synchronous dynamic RAM ("SDRAM"), and/or static RAM ("SRAM"). In some embodiments, the memory 1310 includes non-volatile computer storage media. For example, the memory 1310 may include a hard disk drive, a flash memory, or any other suitable non-volatile computer storage device. In some embodiments, the memory 1310 includes both volatile and non-volatile computer storage media.

In some embodiments, the memory 1310 stores data related to early termination of an uplink transmission. For example, the memory 1310 may store various parameters, configurations, policies, and the like as described above. In certain embodiments, the memory 1310 also stores program code and related data, such as an operating system or other controller algorithms operating on the network equipment apparatus 1300.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, is designed to output visual, audible, and/or haptic signals. In some embodiments, the output device 1320 includes an electronically controllable display or display device capable of outputting visual data to a user. For example, the output device 1320 may include, but is not limited to, an LCD display, an LED display, an OLED display, a projector, or similar display device capable of outputting images, text, or the like to a user. As another, non-limiting, example, the output device 1320 may include a wearable display separate from, but communicatively coupled to, the rest of the network equipment apparatus 1300, such as a smart watch, smart glasses, a heads-up display, or the like. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all or portions of the output device 1320 may be integrated with the input device 1315. For example, the input device 1315 and output device 1320 may form a touchscreen or similar touch-sensitive display. In other embodiments, the output device 1320 may be located near the input device 1315.

The transceiver 1325 includes at least transmitter 1330 and at least one receiver 1335. One or more transmitters 1330 may be used to communicate with the UE, as described herein. Similarly, one or more receivers 1335 may be used to communicate with network functions in the PLMN and/or RAN, as described herein. Although only one transmitter 1330 and one receiver 1335 are illustrated, the network equipment apparatus 1300 may have any suitable number of transmitters 1330 and receivers 1335. Further, the transmitter(s) 1325 and the receiver(s) 1330 may be any suitable type of transmitters and receivers.

Figure 14:
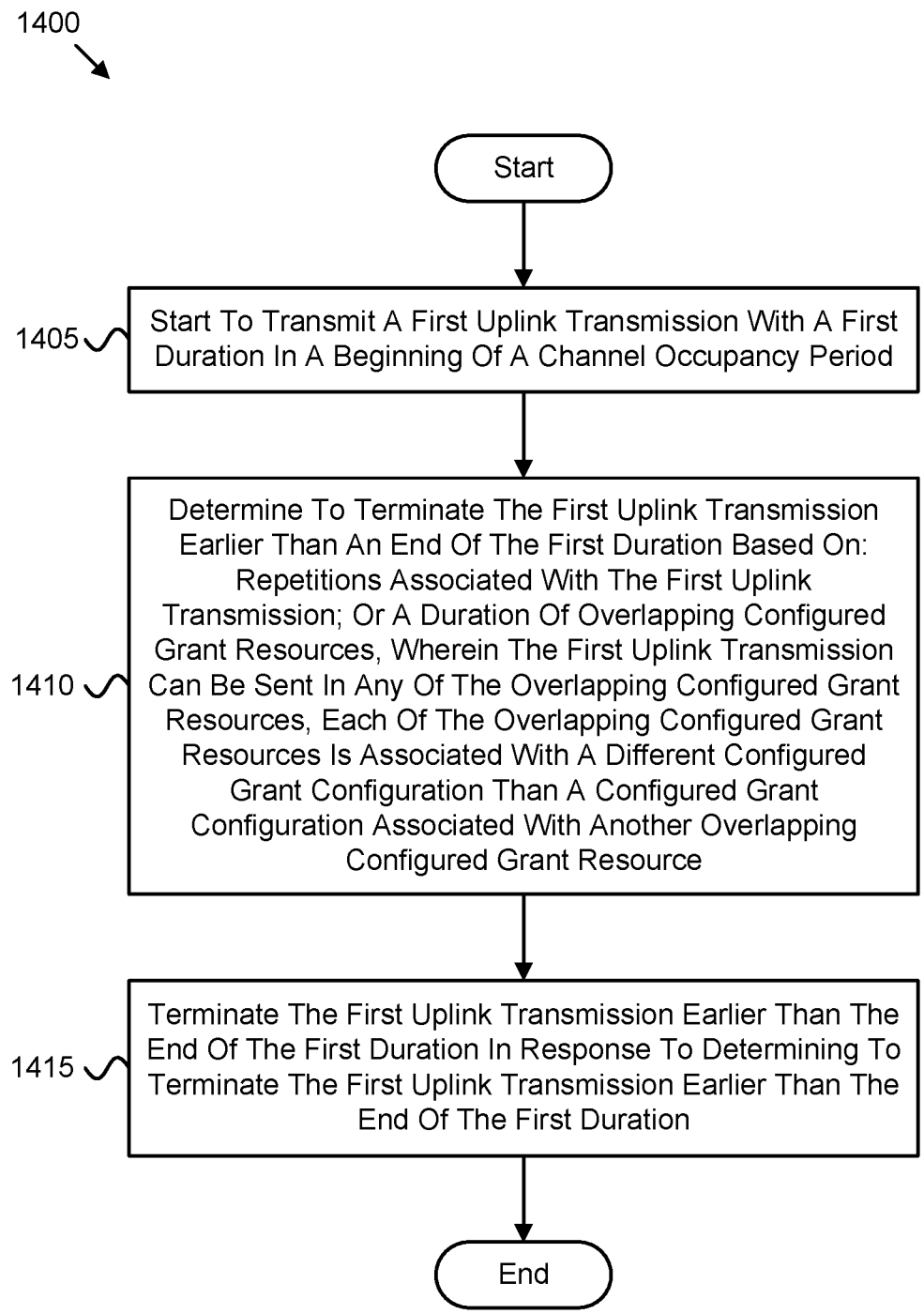
FIG. 14 is a flowchart diagram illustrating one embodiment of a method for early termination of an uplink transmission.

FIG. 14 depicts one embodiment of a method 1400 for early termination of an uplink transmission, according to embodiments of the disclosure. In various embodiments, the method 1400 is performed by a UE, such as the remote unit 105 and/or the user equipment apparatus 1200, described above. In some embodiments, the method 1400 is performed by a processor, such as a microcontroller, a microprocessor, a CPU, a GPU, an auxiliary processing unit, a FPGA, or the like.

The method 1400 includes starting 1405 to transmit a first uplink transmission with a first duration in a beginning of a channel occupancy period. In some embodiments, the method 1400 includes determining 1410 to terminate the first uplink transmission earlier than an end of the first duration based on: repetitions associated with the first uplink transmission; or a duration of overlapping configured grant resources. The first uplink transmission can be sent in any of the overlapping configured grant resources, and each of the overlapping configured grant resources is associated with a different configured grant configuration than a configured grant configuration associated with another overlapping configured grant resource. In certain embodiments, the method 1400 includes terminating 1415 the first uplink transmission earlier than the end of the first duration in response to determining to terminate the first uplink transmission earlier than the end of the first duration. The method 1400 ends.

In certain embodiments, a number of repetitions associated with the first uplink transmission is K1, the first uplink transmission is terminated at the end of repetition K, and K<K1

In some embodiments, K is determined based on a repetition duration and a parameter indicating a maximum transmission duration for uplink transmissions in the beginning of the channel occupancy period. In various embodiments, K is a largest repetition number for which a duration of the K repetitions (from beginning of the first UL transmission till the end of the Kth repetition) is less than the indicated maximum transmission duration. In one embodiment, the repetitions are nominal repetitions.

In certain embodiments, a first configured grant resource of a first configured grant configuration overlaps with a second configured grant resource of a second configured grant configuration, and the first uplink transmission is sent in the first configured grant resource if the first configured grant resource ends earlier than the second configured grant resource. In some embodiments, the first configured grant configuration and the second configured grant configuration have the same priority. In various embodiments, the first uplink transmission corresponds to transmission of a transport block.

In one embodiment, the transport block is a new transport block or a previously transmitted transport block after a retransmission timer has expired. In certain embodiments, the transport block is mapped to a first hybrid automatic repeat request process associated with the first configured grant configuration. In some embodiments, the first configured grant configuration and the second configured grant configuration have a same configuration parameter value.

In various embodiments, the configuration parameter comprises: a demodulation reference signal configuration: a power control parameter: a modulation and coding scheme and a transport block size: a pathloss reference: a priority: a redundancy sequence: a redundancy start index: or some combination thereof. In one embodiment, the method 1400 further comprises: transmitting a first uplink transmission in a first configured grant resource of a first configured grant configuration with a first transmission power in the beginning of the channel occupancy period; and transmitting a second uplink transmission in a second configured grant resource of the first configured grant configuration with a second transmission power in the channel occupancy period, wherein the first transmission power and the second transmission power are different. In certain embodiments, the first transmission power is larger than the second transmission power.

In some embodiments, the second transmission power is determined based on the first configured grant configuration, and the first transmission power is determined based on the second transmission power. In various embodiments, the first configured grant configuration is associated with a high priority. In one embodiment, the method 1400 further comprises transmitting a third uplink transmission in a third configured grant resource of the first configured grant configuration with the first transmission power in the channel occupancy period if the third configured grant resource is within a predetermined time from the beginning of the channel occupancy period.

Figure 15:
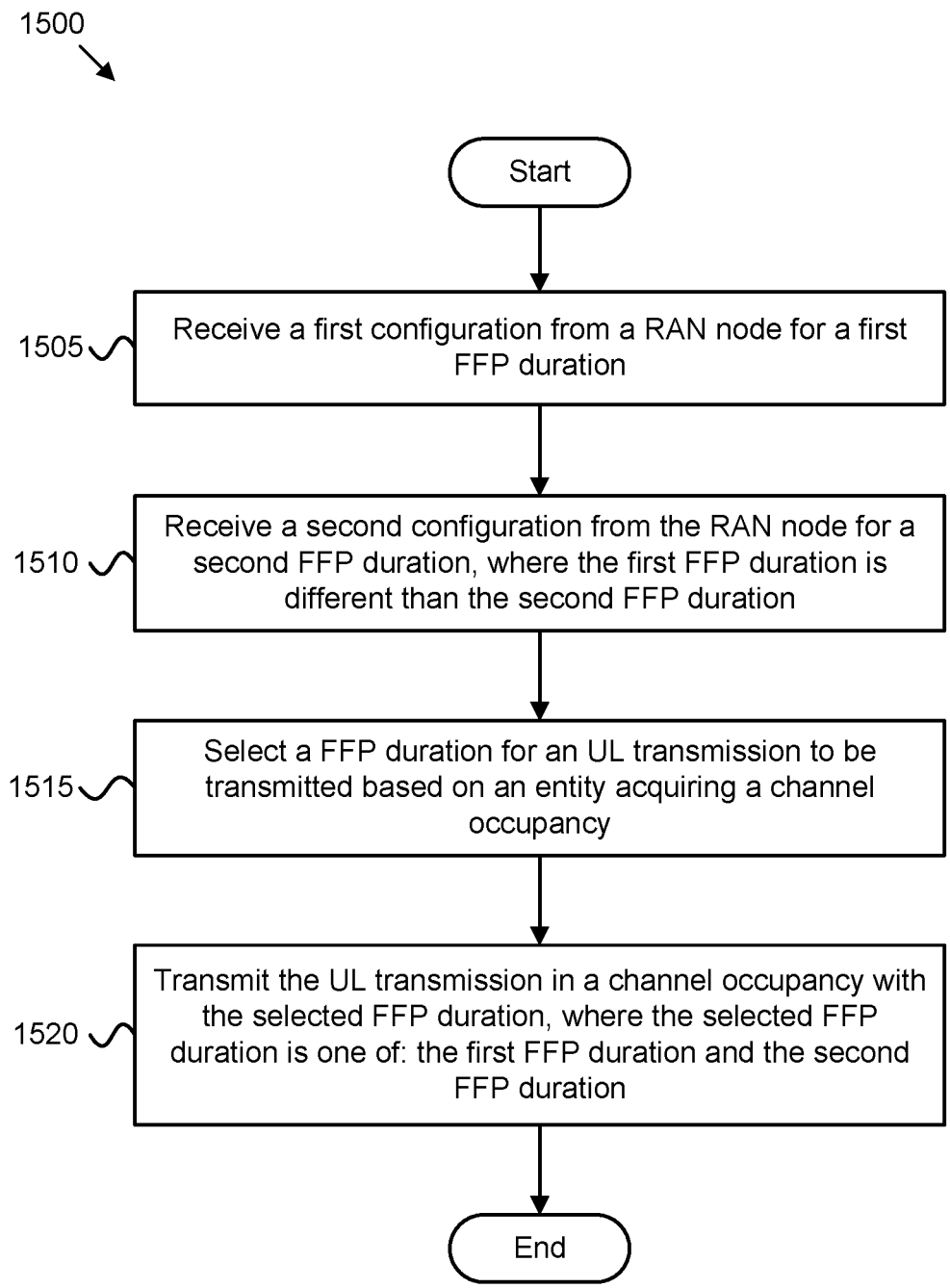
FIG. 15 is a flowchart diagram illustrating one embodiment of a method for uplink transmission using selective fixed frame period operation.

FIG. 15 depicts one embodiment of a method 1500 for uplink transmission using selective fixed frame period operation. In various embodiments, the method 1500 is performed by a user equipment device in a mobile communication network, such as the remote unit 105, the UE 205, and/or the user equipment apparatus 500, described above. In some embodiments, the method 1500 is performed by a processor, such as a microcontroller, a microprocessor, a CPU, a GPU, an auxiliary processing unit, a FPGA, or the like.

The method 1500 begins and receives 1505 a first configuration from a RAN node for a first FFP duration. The method 1500 includes receiving 1510 a second configuration from the RAN node for a second FFP duration, where the first FFP duration is different than the second FFP duration. The method 1500 includes selecting 1515 a FFP duration for an UL transmission to be transmitted based on an entity acquiring a channel occupancy. The method 1500 includes transmitting 1520 the UL transmission in a channel occupancy with the selected FFP duration, where the selected FFP duration is one of: the first FFP duration and the second FFP duration. The method 1500 ends.

In one embodiment, a method comprises: starting to transmit a first uplink transmission with a first duration in a beginning of a channel occupancy period: determining to terminate the first uplink transmission earlier than an end of the first duration based on: repetitions associated with the first uplink transmission: or a duration of overlapping configured grant resources, wherein the first uplink transmission can be sent in any of the overlapping configured grant resources, each of the overlapping configured grant resources is associated with a different configured grant configuration than a configured grant configuration associated with another overlapping configured grant resource; and terminating the first uplink transmission earlier than the end of the first duration in response to determining to terminate the first uplink transmission earlier than the end of the first duration.

In certain embodiments, a number of repetitions associated with the first uplink transmission is K1, the first uplink transmission is terminated at the end of repetition K, and K<K1.

In some embodiments, K is determined based on a repetition duration and a parameter indicating a maximum transmission duration for uplink transmissions in the beginning of the channel occupancy period.

In various embodiments, K is a largest repetition number for which a duration of the K repetitions (from beginning of the first UL transmission till the end of the Kth repetition) is less than the indicated maximum transmission duration.

In one embodiment, the repetitions are nominal repetitions.

In certain embodiments, a first configured grant resource of a first configured grant configuration overlaps with a second configured grant resource of a second configured grant configuration, and the first uplink transmission is sent in the first configured grant resource if the first configured grant resource ends earlier than the second configured grant resource.

In some embodiments, the first configured grant configuration and the second configured grant configuration have the same priority.

In various embodiments, the first uplink transmission corresponds to transmission of a transport block.

In one embodiment, the transport block is a new transport block or a previously transmitted transport block after a retransmission timer has expired.

In certain embodiments, the transport block is mapped to a first hybrid automatic repeat request process associated with the first configured grant configuration.

In some embodiments, the first configured grant configuration and the second configured grant configuration have a same configuration parameter value.

In various embodiments, the configuration parameter comprises: a demodulation reference signal configuration: a power control parameter: a modulation and coding scheme and a transport block size: a pathloss reference: a priority: a redundancy sequence: a redundancy start index: or some combination thereof.

In one embodiment, the method further comprises: transmitting a first uplink transmission in a first configured grant resource of a first configured grant configuration with a first transmission power in the beginning of the channel occupancy period; and transmitting a second uplink transmission in a second configured grant resource of the first configured grant configuration with a second transmission power in the channel occupancy period, wherein the first transmission power and the second transmission power are different.

In certain embodiments, the first transmission power is larger than the second transmission power.

In some embodiments, the second transmission power is determined based on the first configured grant configuration, and the first transmission power is determined based on the second transmission power.

In various embodiments, the first configured grant configuration is associated with a high priority.

In one embodiment, the method further comprises transmitting a third uplink transmission in a third configured grant resource of the first configured grant configuration with the first transmission power in the channel occupancy period if the third configured grant resource is within a predetermined time from the beginning of the channel occupancy period.

In one embodiment, an apparatus comprises: a processor that: starts to transmit a first uplink transmission with a first duration in a beginning of a channel occupancy period: determines to terminate the first uplink transmission earlier than an end of the first duration based on: repetitions associated with the first uplink transmission; or a duration of overlapping configured grant resources, wherein the first uplink transmission can be sent in any of the overlapping configured grant resources, each of the overlapping configured grant resources is associated with a different configured grant configuration than a configured grant configuration associated with another overlapping configured grant resource; and terminates the first uplink transmission earlier than the end of the first duration in response to determining to terminate the first uplink transmission earlier than the end of the first duration.

In certain embodiments, a number of repetitions associated with the first uplink transmission is K1, the first uplink transmission is terminated at the end of repetition K, and K<K1.

In some embodiments, K is determined based on a repetition duration and a parameter indicating a maximum transmission duration for uplink transmissions in the beginning of the channel occupancy and/or FFP period.

In various embodiments, K is a largest repetition number for which a duration of the K repetitions (from beginning of the first UL transmission till the end of the Kth repetition) is less than the indicated maximum transmission duration.

In one embodiment, the repetitions are nominal repetitions.

In certain embodiments, a first configured grant resource of a first configured grant configuration overlaps with a second configured grant resource of a second configured grant configuration, and the first uplink transmission is sent in the first configured grant resource if the first configured grant resource ends earlier than the second configured grant resource.

In some embodiments, the first configured grant configuration and the second configured grant configuration have the same priority.

In various embodiments, the first uplink transmission corresponds to transmission of a transport block.

In one embodiment, the transport block is a new transport block or a previously transmitted transport block after a retransmission timer has expired.

In certain embodiments, the transport block is mapped to a first hybrid automatic repeat request process associated with the first configured grant configuration.

In some embodiments, the first configured grant configuration and the second configured grant configuration have a same configuration parameter value.

In various embodiments, the configuration parameter comprises: a demodulation reference signal configuration; a power control parameter; a modulation and coding scheme and a transport block size; a pathloss reference; a priority; a redundancy sequence; a redundancy version start index such as starting from redundancy version 0 ("RV0"); or some combination thereof.

In one embodiment, the apparatus further comprises a transmitter, wherein: the transmitter transmits a first uplink transmission in a first configured grant resource of a first configured grant configuration with a first transmission power in the beginning of the channel occupancy and/or FFP period; and the transmitter transmits a second uplink transmission in a second configured grant resource of the first configured grant configuration with a second transmission power in the channel occupancy and/or FFP period, wherein the first transmission power and the second transmission power are different.

In certain embodiments, the first transmission power is larger than the second transmission power.

In some embodiments, the second transmission power is determined based on the first configured grant configuration, and the first transmission power is determined based on the second transmission power.

In various embodiments, the first configured grant configuration is associated with a high priority.

In one embodiment, the transmitter transmits a third uplink transmission in a third configured grant resource of the first configured grant configuration with the first transmission power in the channel occupancy period if the third configured grant resource is within a predetermined time from the beginning of the channel occupancy period.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
    starting to transmit a first uplink transmission with a first duration in a first configured grant resource of a first configured grant configuration with a first transmission power in a beginning of a channel occupancy period;
    transmitting a second uplink transmission in a second configured grant resource of the first configured grant configuration with a second transmission power in the channel occupancy period, wherein the first transmission power and the second transmission power are different;
    determining to terminate the first uplink transmission earlier than an end of the first duration based on:
        repetitions associated with the first uplink transmission; or
        a duration of overlapping configured grant resources, wherein the first uplink transmission can be sent in any of the overlapping configured grant resources, each of the overlapping configured grant resources is associated with a different configured grant configuration than a configured grant configuration associated with another overlapping configured grant resource; and
    terminating the first uplink transmission earlier than the end of the first duration in response to determining to terminate the first uplink transmission earlier than the end of the first duration.

2. The method of claim 1, wherein a number of repetitions associated with the first uplink transmission is K1, the first uplink transmission is terminated at the end of repetition K, K<K1, and K is an integer greater than 1.

3. The method of claim 1, wherein a first configured grant resource of a first configured grant configuration overlaps with a second configured grant resource of a second configured grant configuration, and the first uplink transmission is sent in the first configured grant resource if the first configured grant resource ends earlier than the second configured grant resource.

4. The method of claim 3, wherein the first configured grant configuration and the second configured grant configuration have a same configuration parameter value, and the configuration parameter comprises one or more of:
    a demodulation reference signal configuration;
    a power control parameter;
    a modulation and coding scheme and a transport block size;
    a pathloss reference;
    a priority;
    a redundancy sequence; or
    a start index.

5. A user equipment (UE), comprising:
    at least one memory; and
    at least one processor coupled with the at least one memory and configured to cause the UE to:

start to transmit a first uplink transmission with a first duration in a first configured grant resource of a first configured grant configuration with a first transmission power in a beginning of a channel occupancy period;

transmit a second uplink transmission in a second configured grant resource of the first configured grant configuration with a second transmission power in the channel occupancy period, wherein the first transmission power and the second transmission power are different;

determine to terminate the first uplink transmission earlier than an end of the first duration based on:
repetitions associated with the first uplink transmission; or
a duration of overlapping configured grant resources, wherein the first uplink transmission can be sent in any of the overlapping configured grant resources, each of the overlapping configured grant resources is associated with a different configured grant configuration than a configured grant configuration associated with another overlapping configured grant resource; and terminate the first uplink transmission earlier than the end of the first duration in response to determining to terminate the first uplink transmission earlier than the end of the first duration.

6. The UE of claim 5, wherein a number of repetitions associated with the first uplink transmission is K1, the first uplink transmission is terminated at the end of repetition K, K<K1, and K is an integer greater than 1.

7. The UE of claim 5, wherein a first configured grant resource of a first configured grant configuration overlaps with a second configured grant resource of a second configured grant configuration, and the first uplink transmission is sent in the first configured grant resource if the first configured grant resource ends earlier than the second configured grant resource.

8. The UE of claim 7, wherein the first configured grant configuration and the second configured grant configuration have a same priority.

9. The UE of claim 7, wherein the first uplink transmission corresponds to transmission of a transport block, and the transport block is a new transport block or a previously transmitted transport block after a retransmission timer has expired.

10. The UE of claim 9, wherein the first configured grant configuration and the second configured grant configuration have a same configuration parameter value, and the configuration parameter comprises one or more of:
a demodulation reference signal configuration;
a power control parameter;
a modulation and coding scheme and a transport block size;
a pathloss reference;
a priority;
a redundancy sequence; or
a start index.

11. The UE of claim 7, wherein the first transmission power is larger than the second transmission power.

12. The UE of claim 7, wherein the second transmission power is determined based on the first configured grant configuration, and the first transmission power is determined based on the second transmission power.

13. The UE of claim 7, wherein the at least one processor is configured to cause the UE to transmit transmitter transmits a third uplink transmission in a third configured grant resource of the first configured grant configuration with the first transmission power in the channel occupancy period if the third configured grant resource is within a predetermined time from the beginning of the channel occupancy period.

14. The method of claim 3, wherein the first configured grant configuration and the second configured grant configuration have a same priority.

15. The method of claim 3, wherein the first uplink transmission corresponds to transmission of a transport block, and the transport block is a new transport block or a previously transmitted transport block after a retransmission timer has expired.

16. The method of claim 1, wherein the first transmission power is larger than the second transmission power.

17. The method of claim 1, wherein the second transmission power is determined based on the first configured grant configuration, and the first transmission power is determined based on the second transmission power.

18. The method of claim 1, further comprising transmitting a third uplink transmission in a third configured grant resource of the first configured grant configuration with the first transmission power in the channel occupancy period if the third configured grant resource is within a predetermined time from the beginning of the channel occupancy period.

* * * * *